(12) United States Patent
Rothera

(10) Patent No.: US 10,348,074 B1
(45) Date of Patent: Jul. 9, 2019

(54) VARIABLE DEPTH FLUSH-MOUNTED ELECTRICAL BOX

(71) Applicant: Paul Bruce Rothera, Nottingham, PA (US)

(72) Inventor: Paul Bruce Rothera, Nottingham, PA (US)

( * ) Notice: Subject to any disclaimer, the term of this patent is extended or adjusted under 35 U.S.C. 154(b) by 0 days.

(21) Appl. No.: 15/887,519

(22) Filed: Feb. 2, 2018

(51) Int. Cl.
*H02G 3/08* (2006.01)

(52) U.S. Cl.
CPC .................................. *H02G 3/086* (2013.01)

(58) Field of Classification Search
None
See application file for complete search history.

(56) References Cited

U.S. PATENT DOCUMENTS

| | | | | |
|---|---|---|---|---|
| 2,622,756 A * | 12/1952 | Appleton | H02G 3/086 | 220/3.94 |
| 2,996,566 A * | 8/1961 | Stas | H02G 3/185 | 174/486 |
| 3,449,706 A * | 6/1969 | Carissimi | H01R 13/5227 | 174/67 |
| 3,525,450 A * | 8/1970 | Payson | H02G 3/14 | 220/3.7 |
| 3,956,573 A * | 5/1976 | Myers | H02G 3/185 | 174/488 |
| 4,343,411 A * | 8/1982 | Chesnut | H02G 3/14 | 174/67 |
| 4,927,039 A * | 5/1990 | McNab | H02G 3/125 | 174/57 |
| 5,573,412 A * | 11/1996 | Anthony | H01R 13/5213 | 220/242 |
| 5,796,047 A * | 8/1998 | Sheng-Hsin | H04M 1/15 | 174/135 |
| 6,302,743 B1 * | 10/2001 | Chiu | H01R 25/003 | 439/22 |
| 6,921,275 B2 * | 7/2005 | Rehmann | G01D 11/24 | 439/333 |
| 7,396,996 B1 * | 7/2008 | Shotey | H02G 3/14 | 174/481 |
| 7,541,540 B1 * | 6/2009 | Shotey | H02G 3/14 | 174/481 |
| 8,269,117 B2 * | 9/2012 | Hoeland | G01D 11/24 | 174/561 |
| 8,899,431 B1 * | 12/2014 | Shotey | H02G 3/086 | 220/3.7 |
| 9,148,007 B2 * | 9/2015 | Drane | H02G 3/185 | |
| 9,496,696 B2 * | 11/2016 | Bulancea | H02G 3/14 | |
| 9,681,563 B2 * | 6/2017 | Hantschel | A47B 97/00 | |
| 2003/0109173 A1 * | 6/2003 | Kidman | H01R 13/73 | 439/535 |

(Continued)

*Primary Examiner* — Dimary S Lopez Cruz
*Assistant Examiner* — Muhammed Azam
(74) *Attorney, Agent, or Firm* — Paul & Paul

(57) ABSTRACT

A kit for forming and installing an electrical box for housing at least one electrical device. The kit comprises a front segment having a rear and a rear segment having a front. The kit may also comprise at least one cover that is capable of being attached to the front segment. The cover has at least one opening through which an electrical device is accessible. The kit may further comprise a plurality of intermediate segments each having a front and a rear having attachment means that allow the segments to be securely attached in series.

8 Claims, 39 Drawing Sheets

(56) References Cited

U.S. PATENT DOCUMENTS

| | | | |
|---|---|---|---|
| 2006/0032654 A1* | 2/2006 | Johnson | H02G 3/086 174/58 |
| 2006/0070762 A1* | 4/2006 | Lazzaro | H02G 3/086 174/50 |
| 2007/0230144 A1* | 10/2007 | Engel | G01D 11/245 361/758 |
| 2008/0041848 A1* | 2/2008 | Denier | H02G 3/086 220/3.9 |
| 2010/0048047 A1* | 2/2010 | Parrish | H01R 13/447 439/142 |
| 2018/0117683 A1* | 5/2018 | Rothera | B23B 49/04 |

* cited by examiner

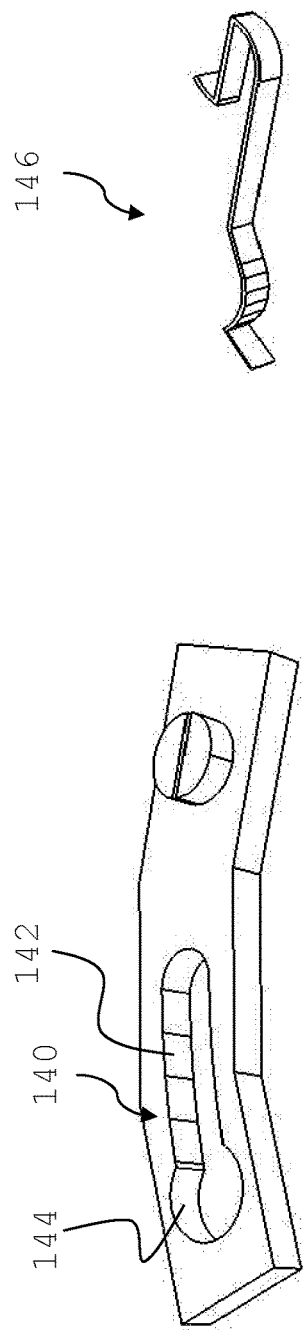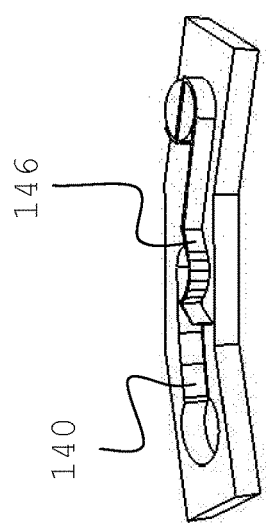
FIG. 15
FIG. 16
FIG. 17

VARIABLE DEPTH FLUSH-MOUNTED ELECTRICAL BOX

BACKGROUND OF THE INVENTION

1. Field of the Invention

The present invention relates to an electrical box for housing an electrical device, such as one or more switches and/or sockets among others.

2. Description of the Prior Art

Most currently available electrical boxes are rectangular and of a fixed size such they cannot be adapted to fit the available space in a particular situation, which may be more limited than usual due to the presence of building structure elements such as piping, wiring conduits, or unusual structural elements within, for example, a wall cavity. In such situations the standard, fixed size electrical boxes may have to be relocated to a location in the structure that may be less than optimal. The need persists in the art for an electrical box whose size can be adapted to fit the available space in a particular situation. Also, locating and making cutouts in the drywall for the traditional rectangular electrical box is time consuming, difficult and fraught with inaccuracy because it is difficult to make accurate and fast linear cuts in the drywall after it has been installed to a wall frame. Accordingly, there is a need in the art for an electrical box whose shape will allow greater efficiency and accuracy in the making of the corresponding cutouts in drywall that has already been laid up against a supporting frame.

SUMMARY OF THE INVENTION

The present invention is directed to an electrical box for housing an electrical device, such as one or more switches and/or sockets. The electrical box of the present invention has a cylindrical shape and a circular front opening to allow the more efficient and accurate making of the corresponding cuts in dry wall using hand and power tools. In one embodiment, the electrical box has a front segment, a rear segment, and a plurality of intermediate segments. The number of intermediate segments can be varied to change the length and/or depth of the electrical box to suit the available space in a particular application.

These and other aspects of the present invention will be made clearer upon study of the detailed description of the invention and the claims provided below and the appended drawings.

BRIEF DESCRIPTION OF THE DRAWINGS

FIGS. 15-16 are views of slot portions.
FIG. 17 is a view of a spring clip.

DETAILED DESCRIPTION OF THE PREFERRED EMBODIMENTS

Figure 1:
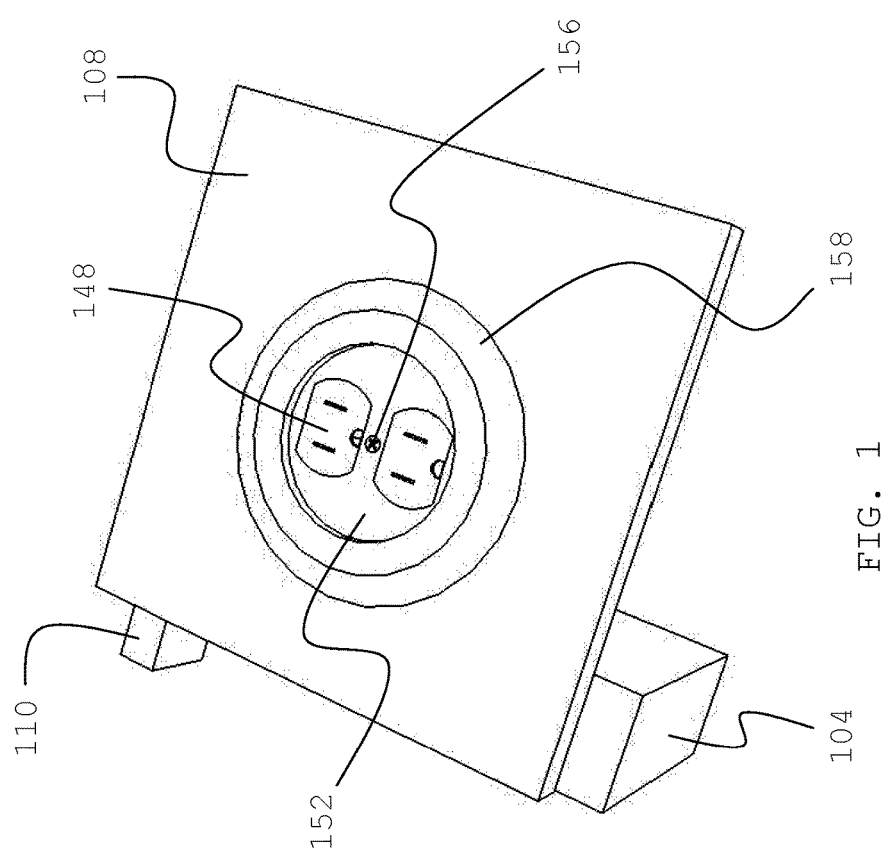
FIGS. 1-3 are perspective views of an electrical box.
Figure 2:
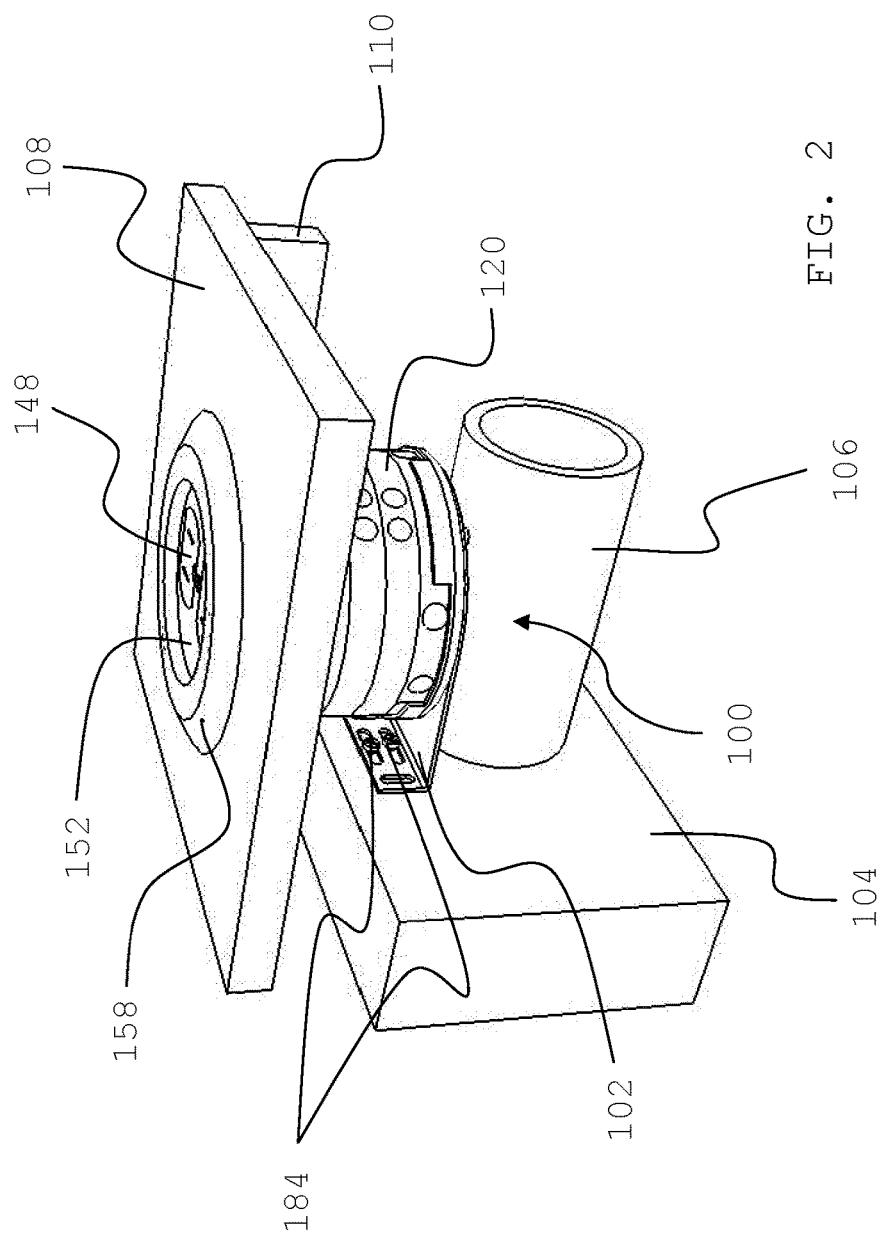
Figure 3:
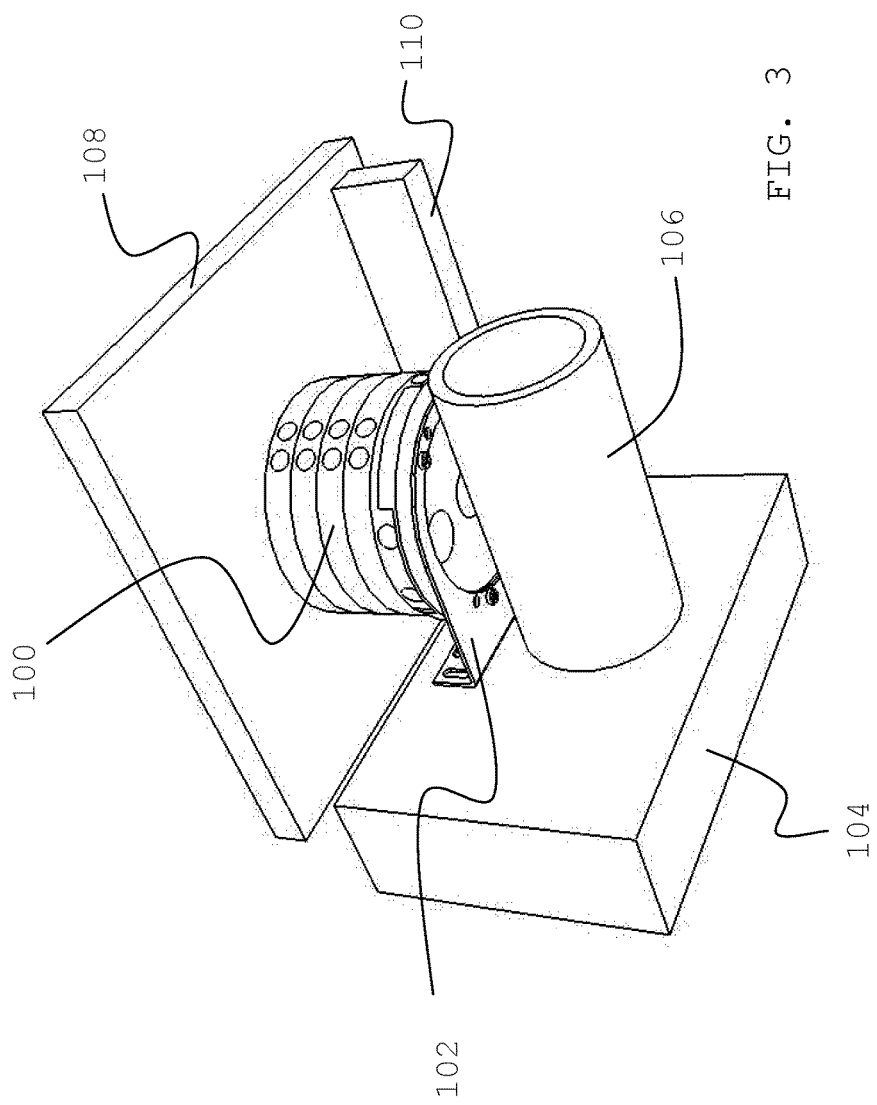
Figure 4:
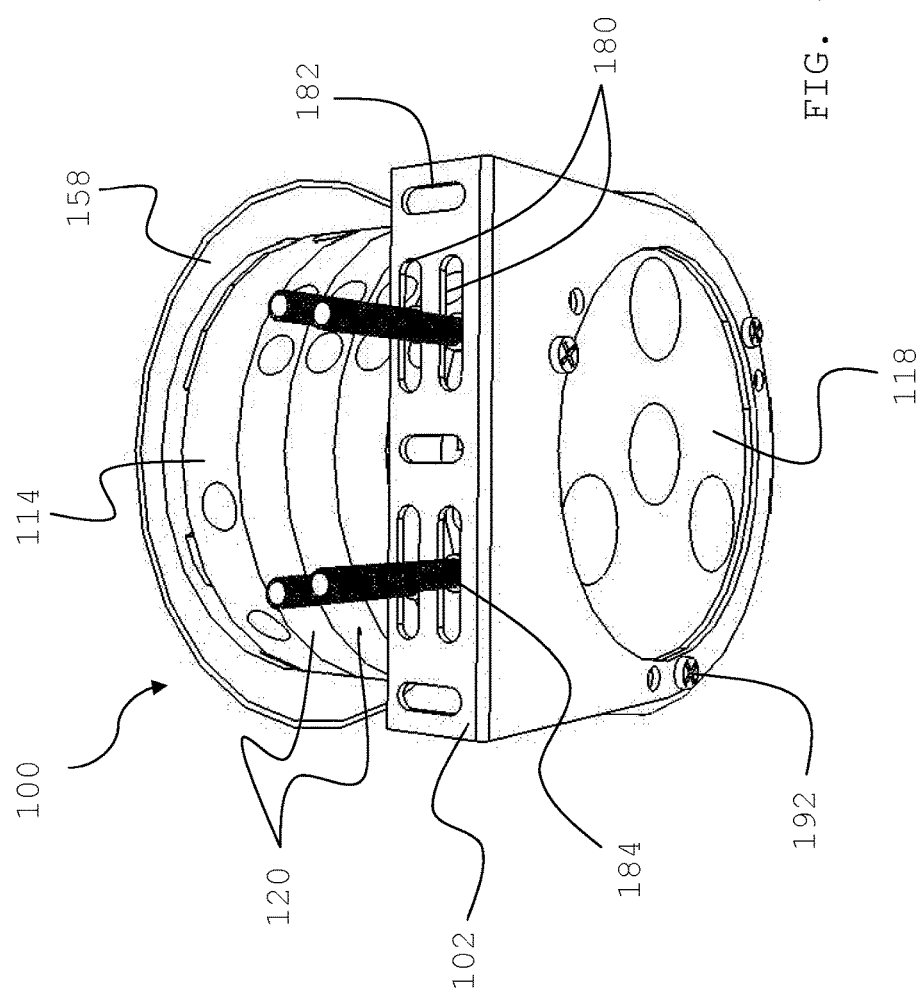
FIG. 4 is a view of the rear segment of the electrical box.
Figure 5:
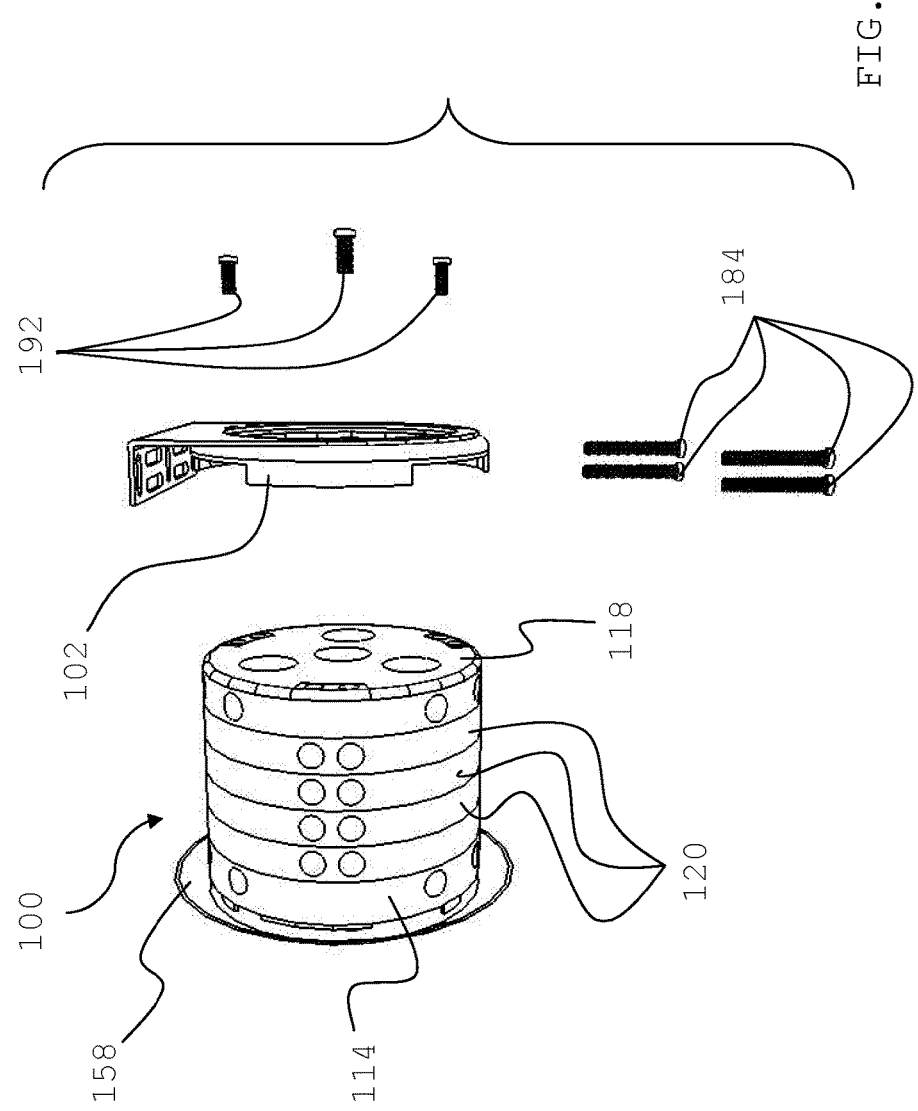
FIGS. 5-6 are views that illustrate the intermediate segments.
Figure 6:
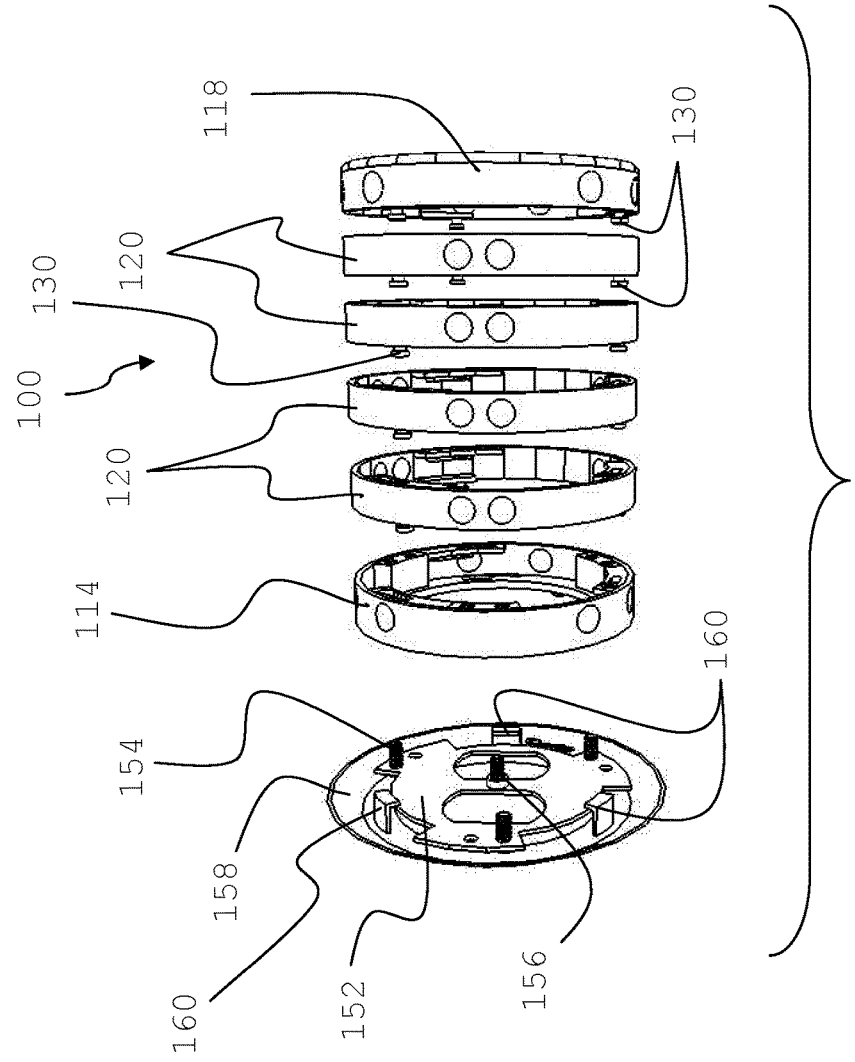
Figure 7:
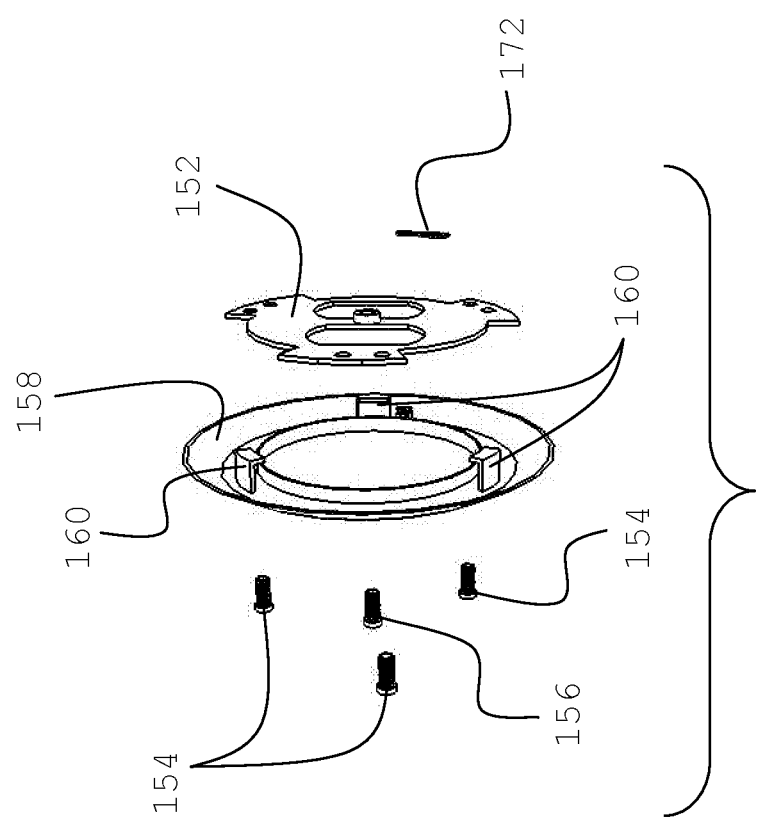
FIGS. 7-10 are perspective views of the outer cover.
Figure 8:
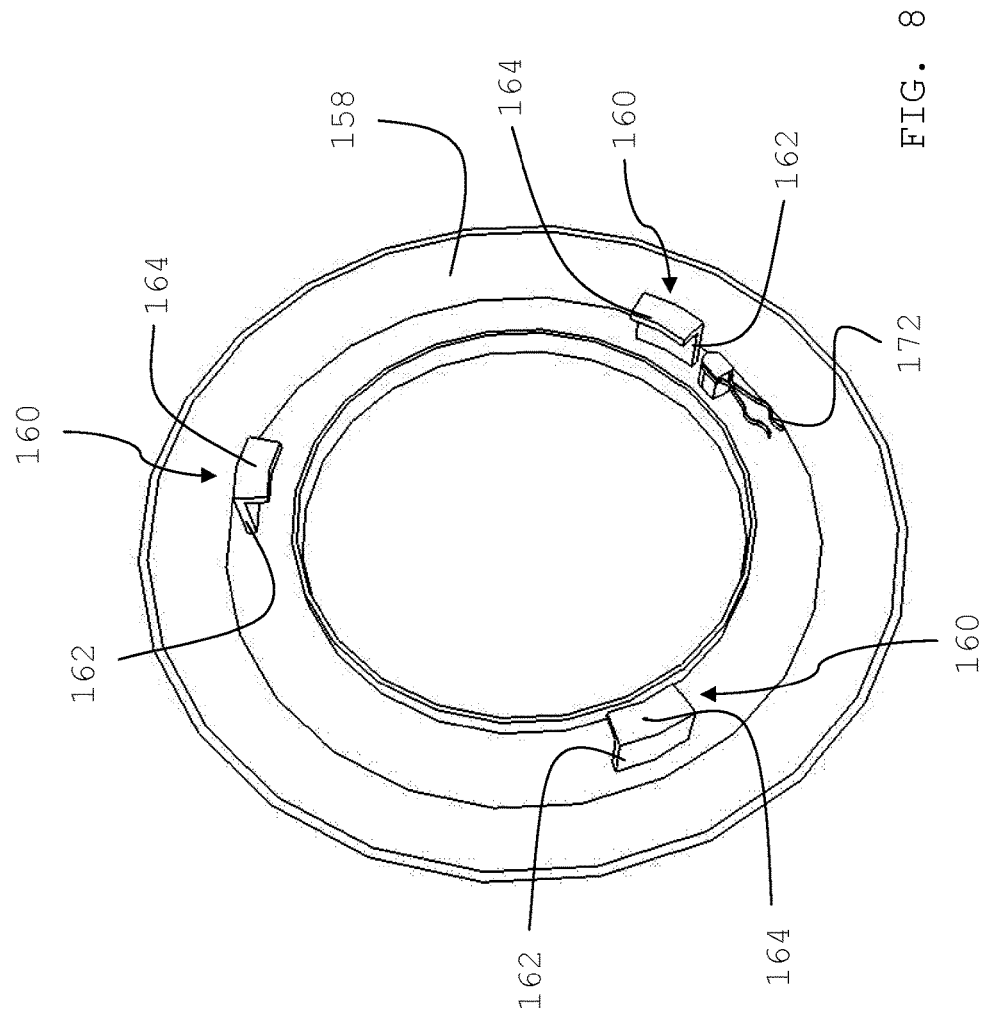
Figure 9:
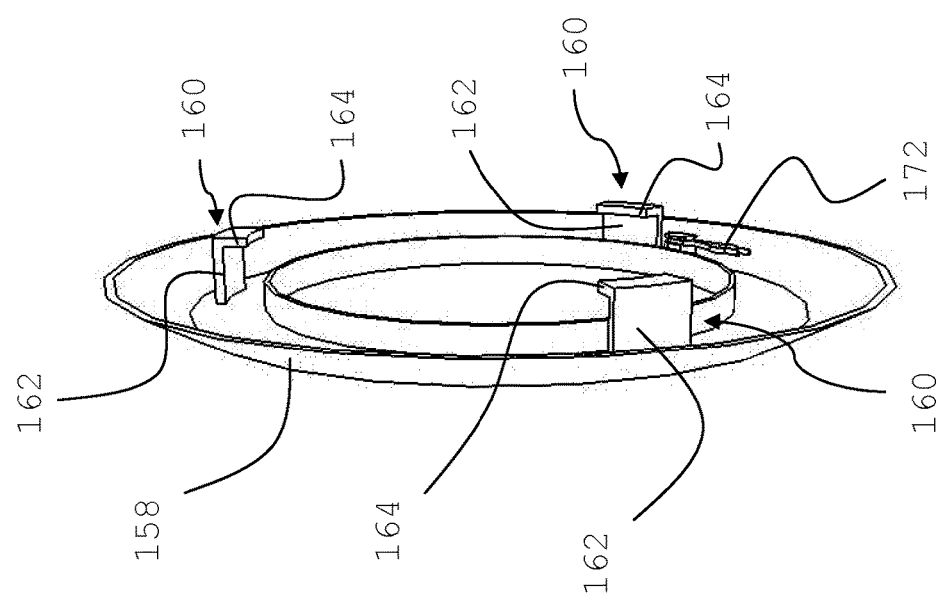
Figure 10:
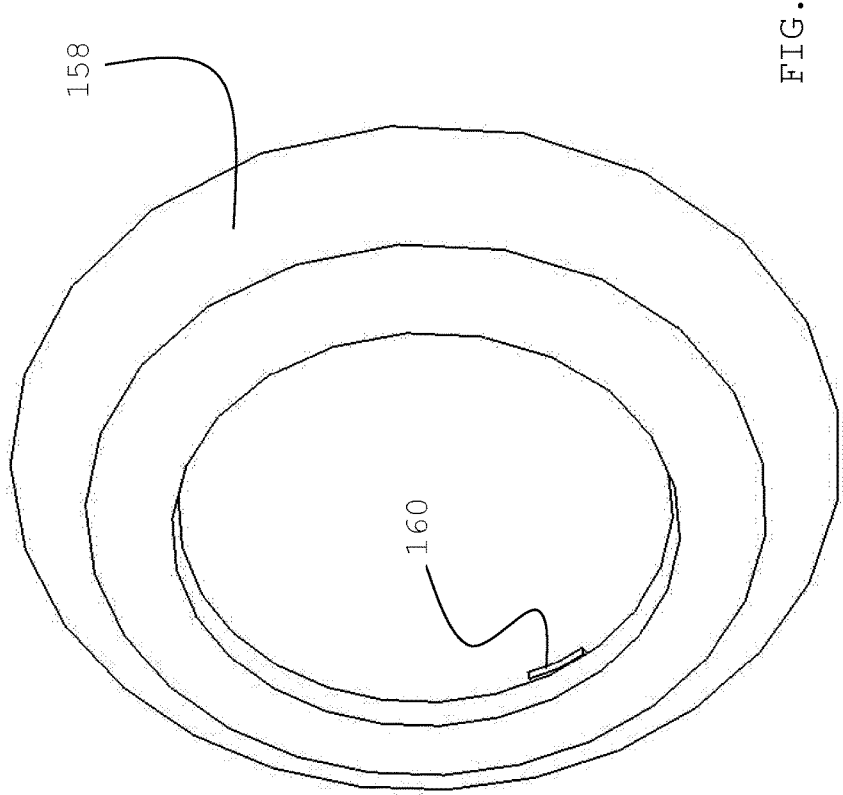
Figure 11:
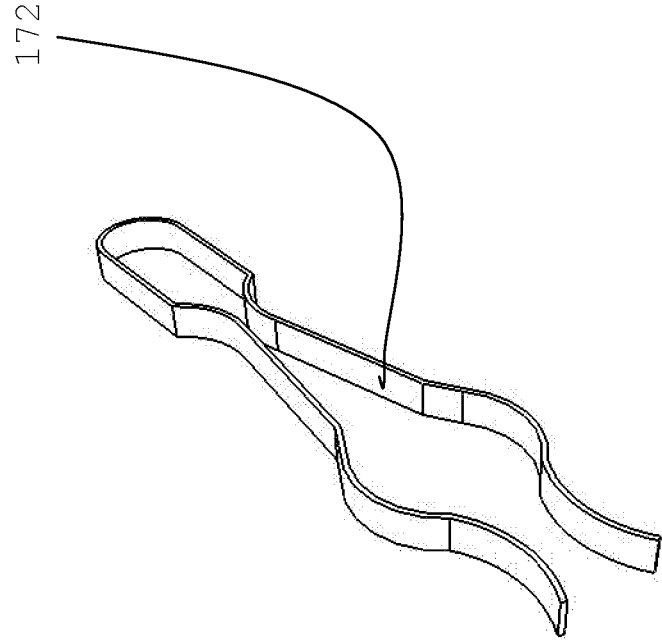
FIG. 11 is a view of a spring clip or hook to secure the outer cover.
Figure 12:
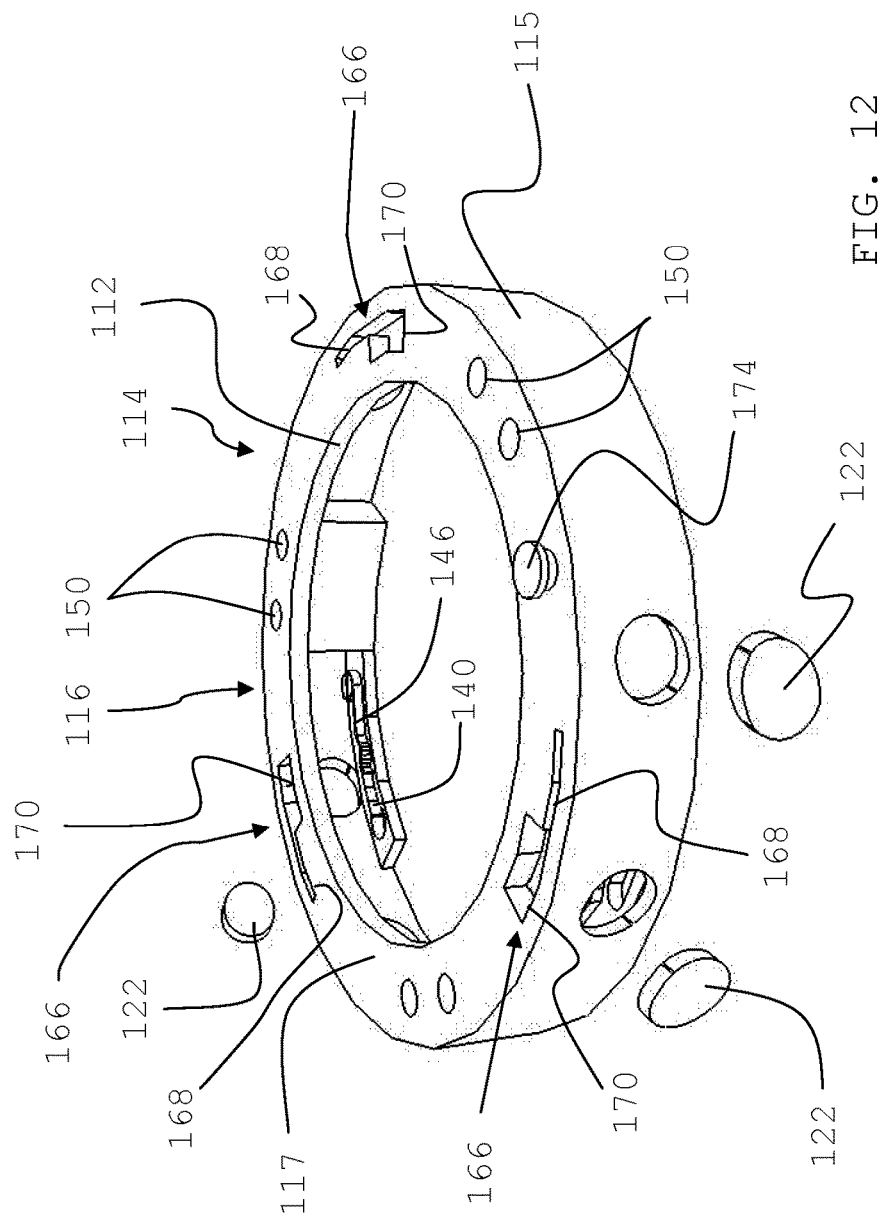
FIGS. 12-14 are views of a front segment.
Figure 13:
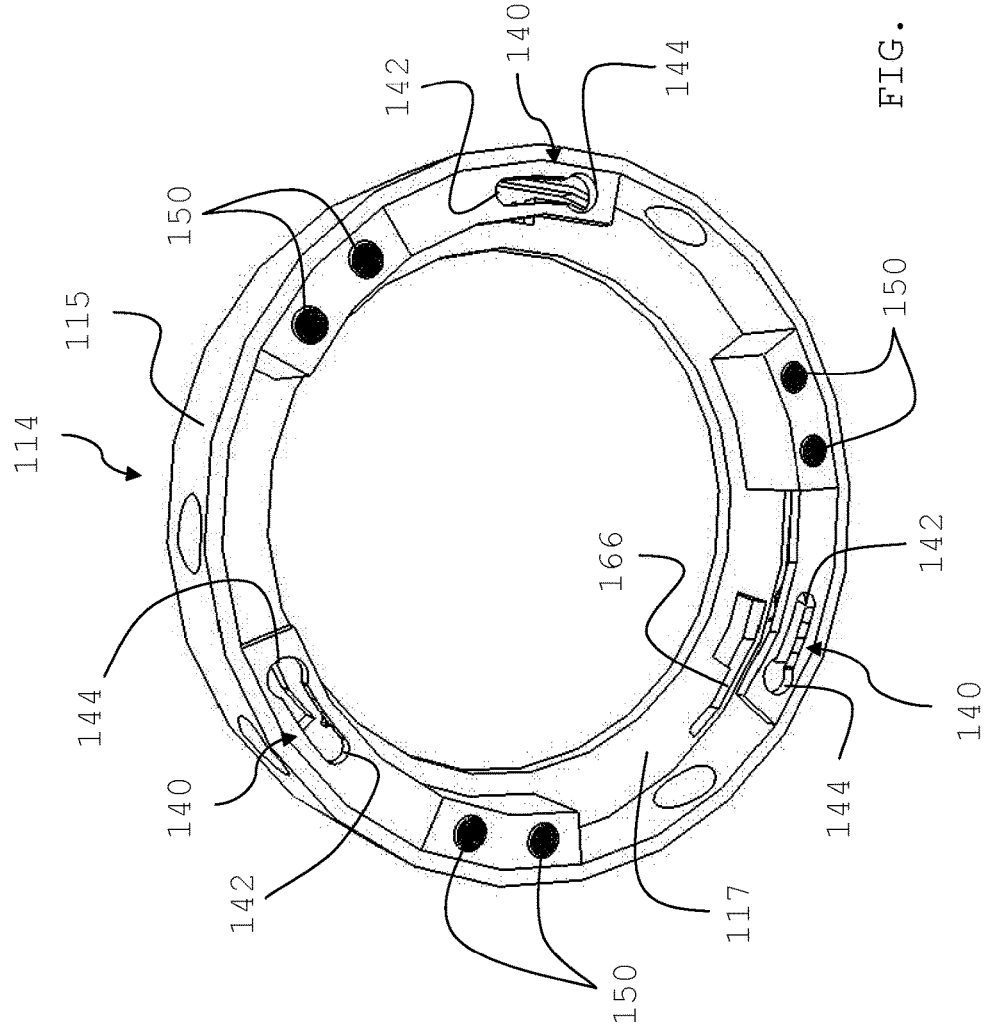
Figure 14:
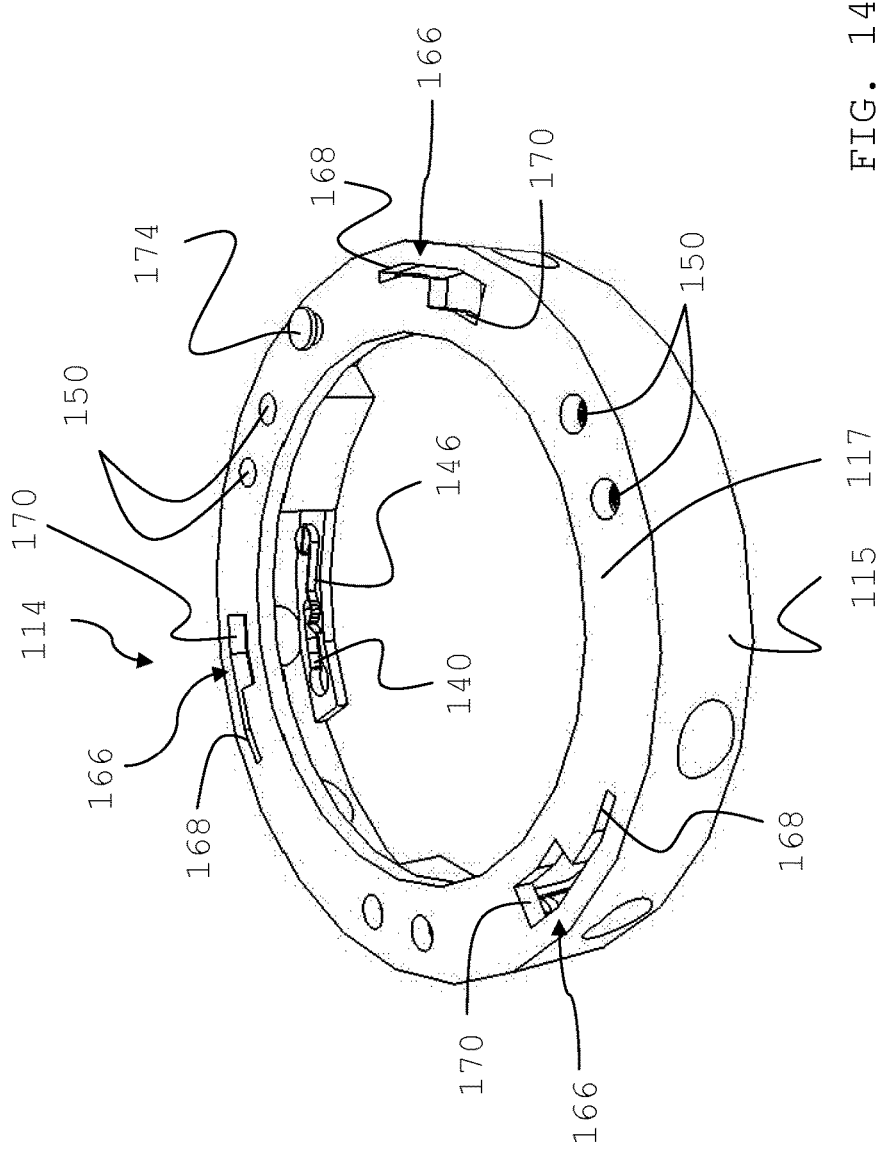
Figure 18:
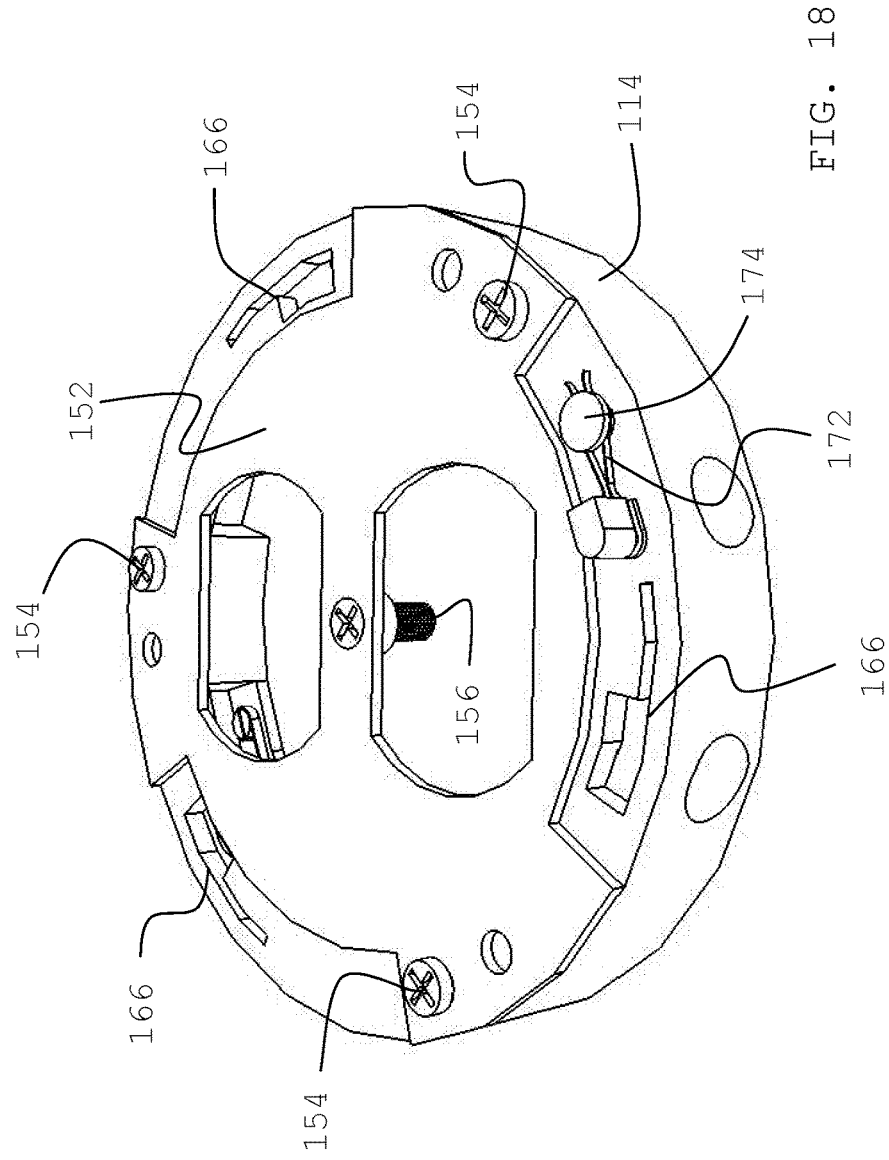
FIGS. 18-21 are views of the front perspective of the electrical box.
Figure 19:
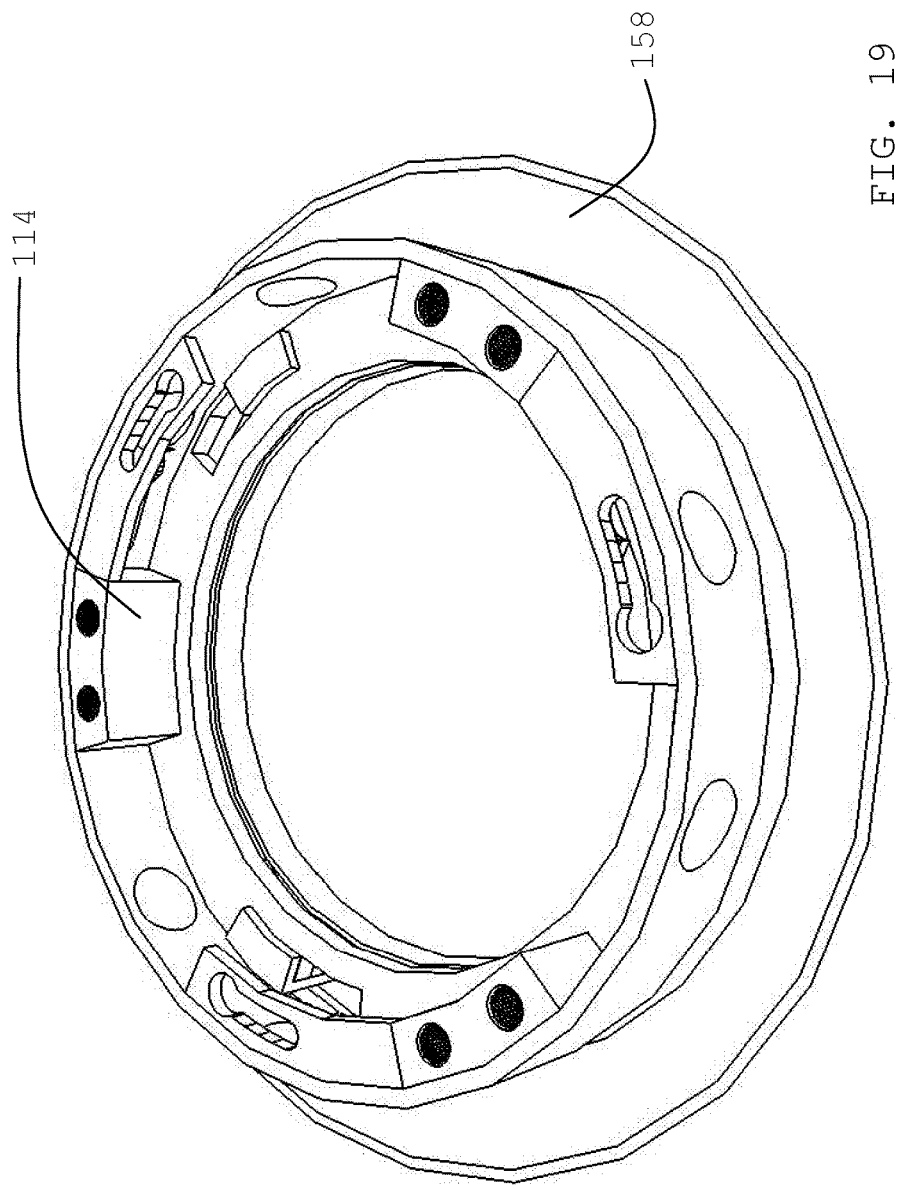
Figure 20:
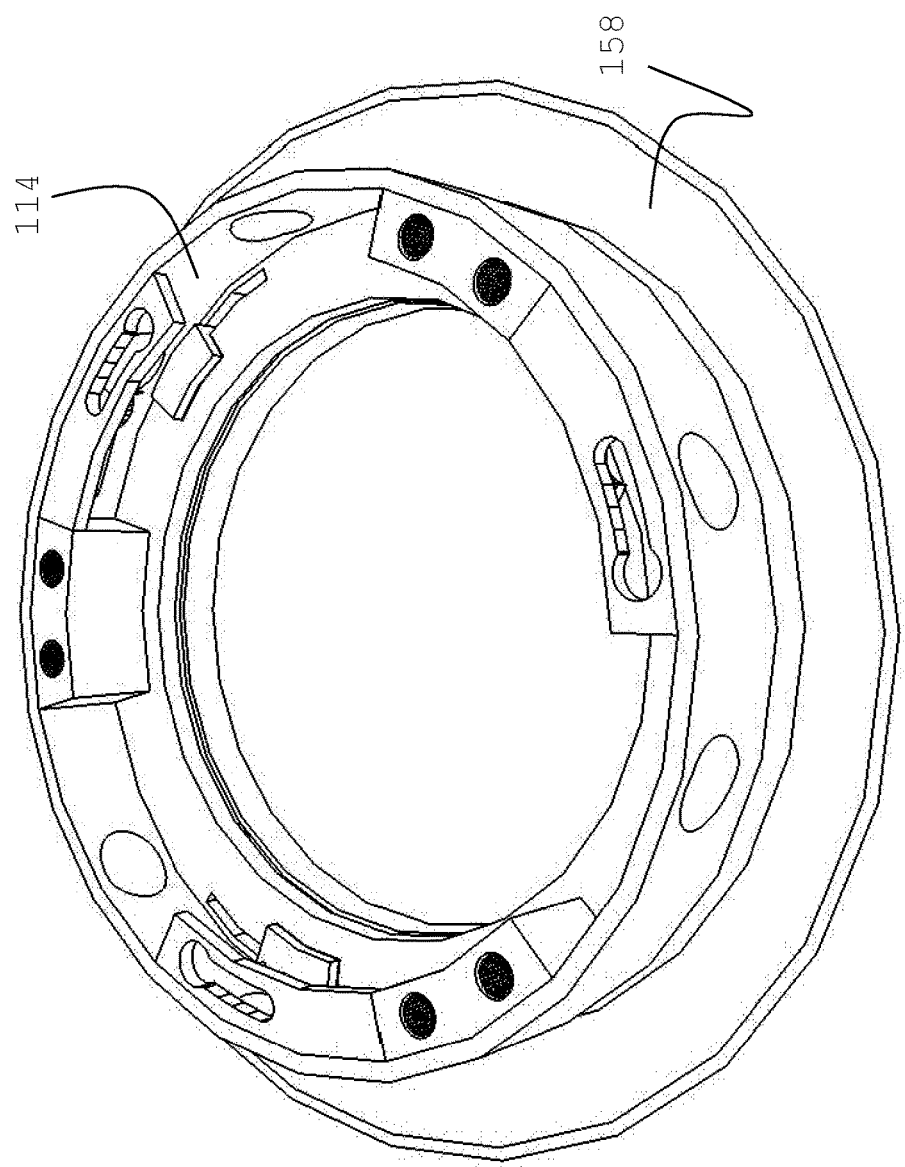
Figure 21:
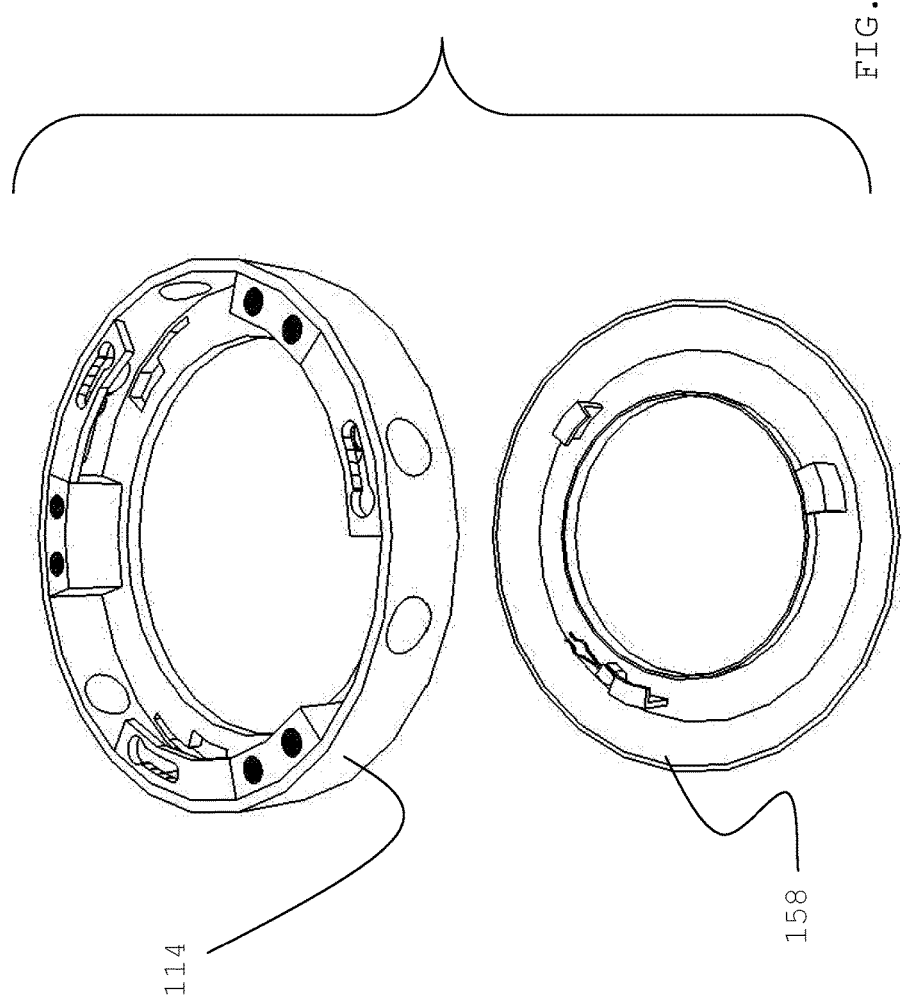
Figure 22:
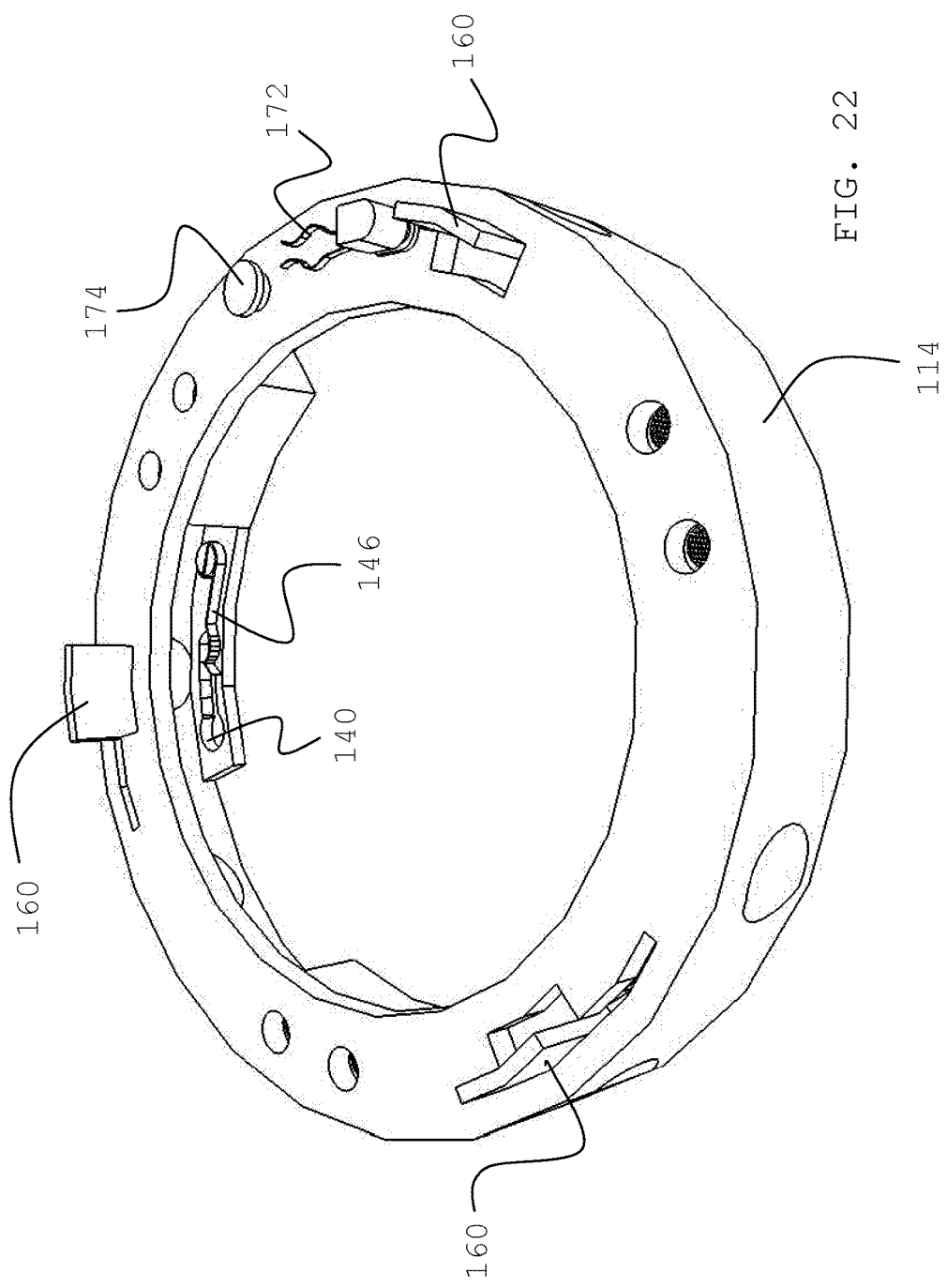
FIGS. 22-23 are views of perspectives of the rear of the outer cover.
Figure 23:
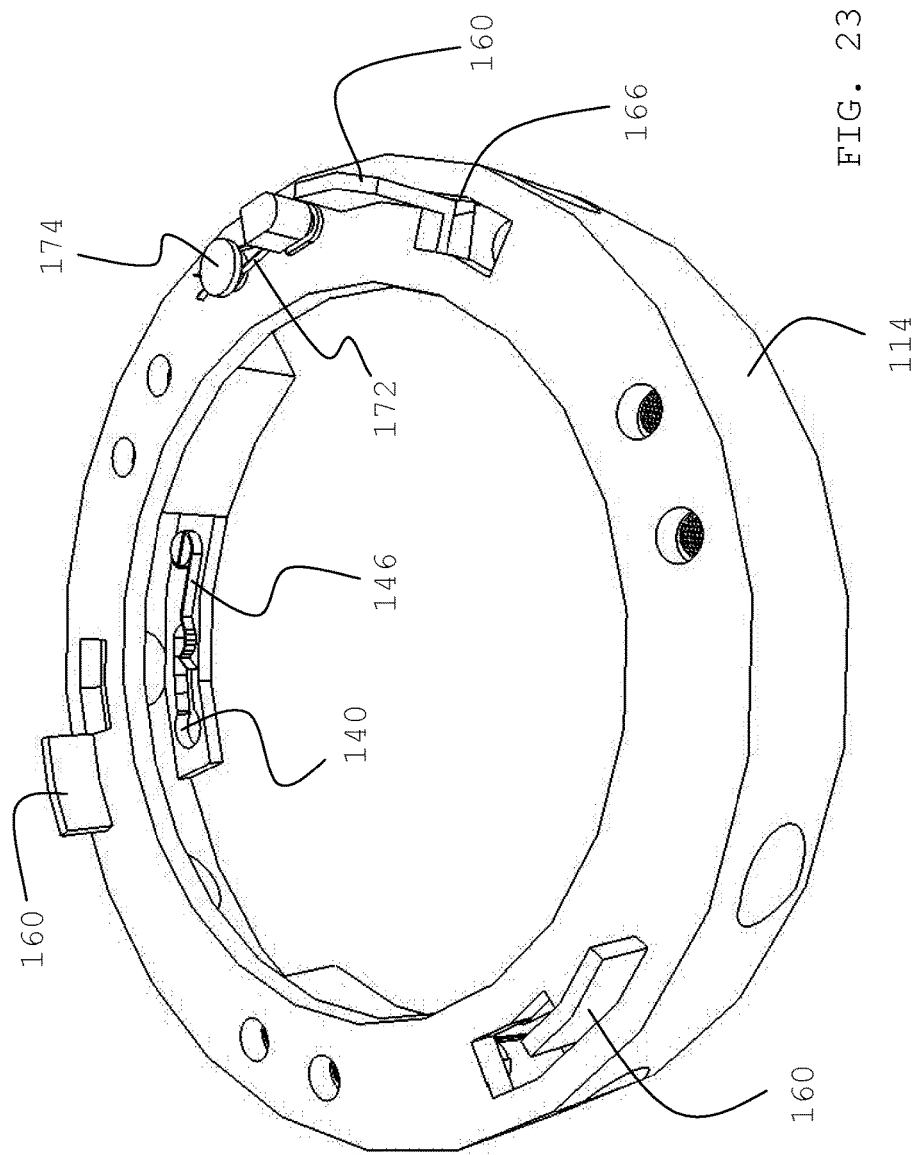
Figure 24:
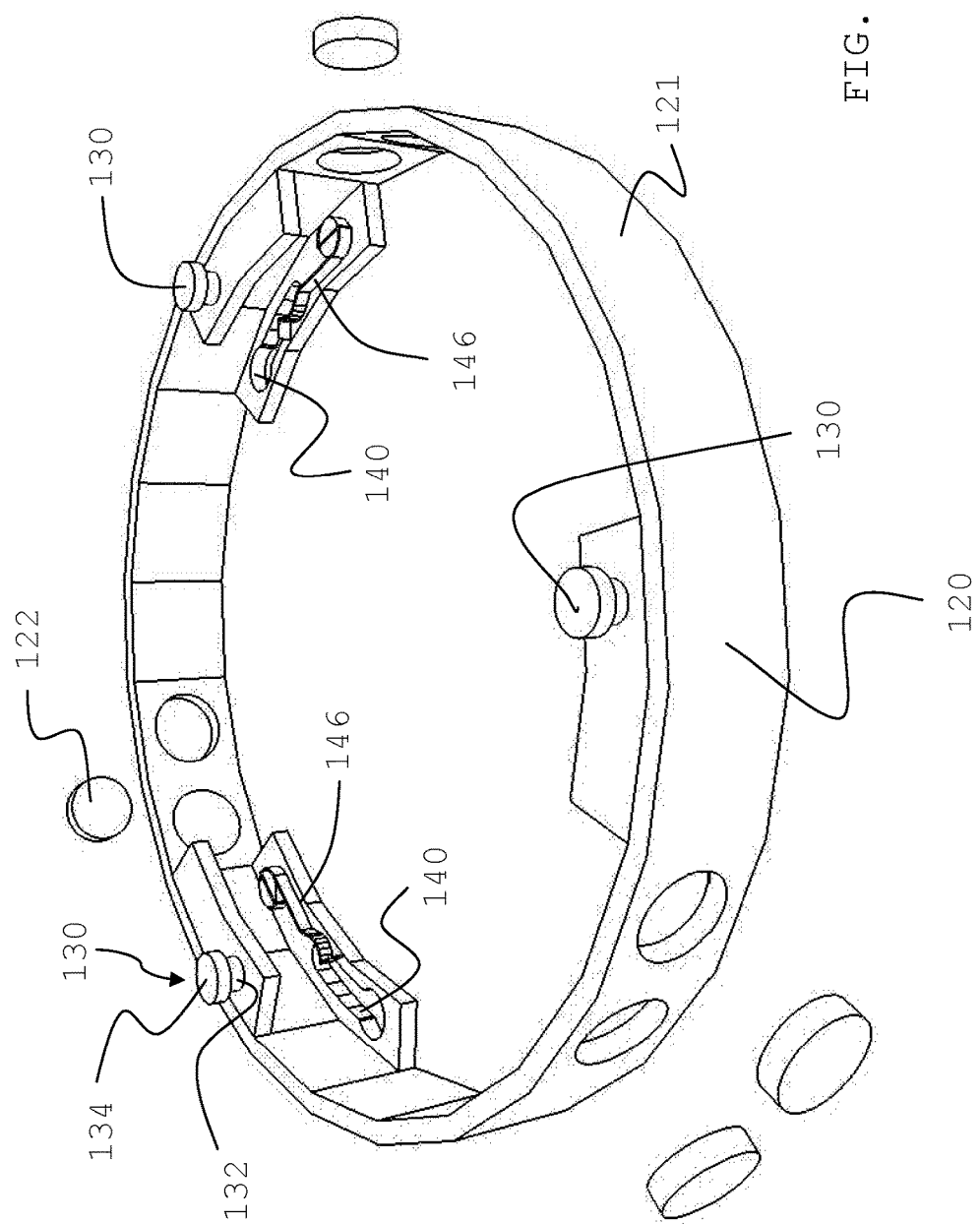
FIGS. 24-38 are views of intermediate segments of the electrical box.
Figure 25:
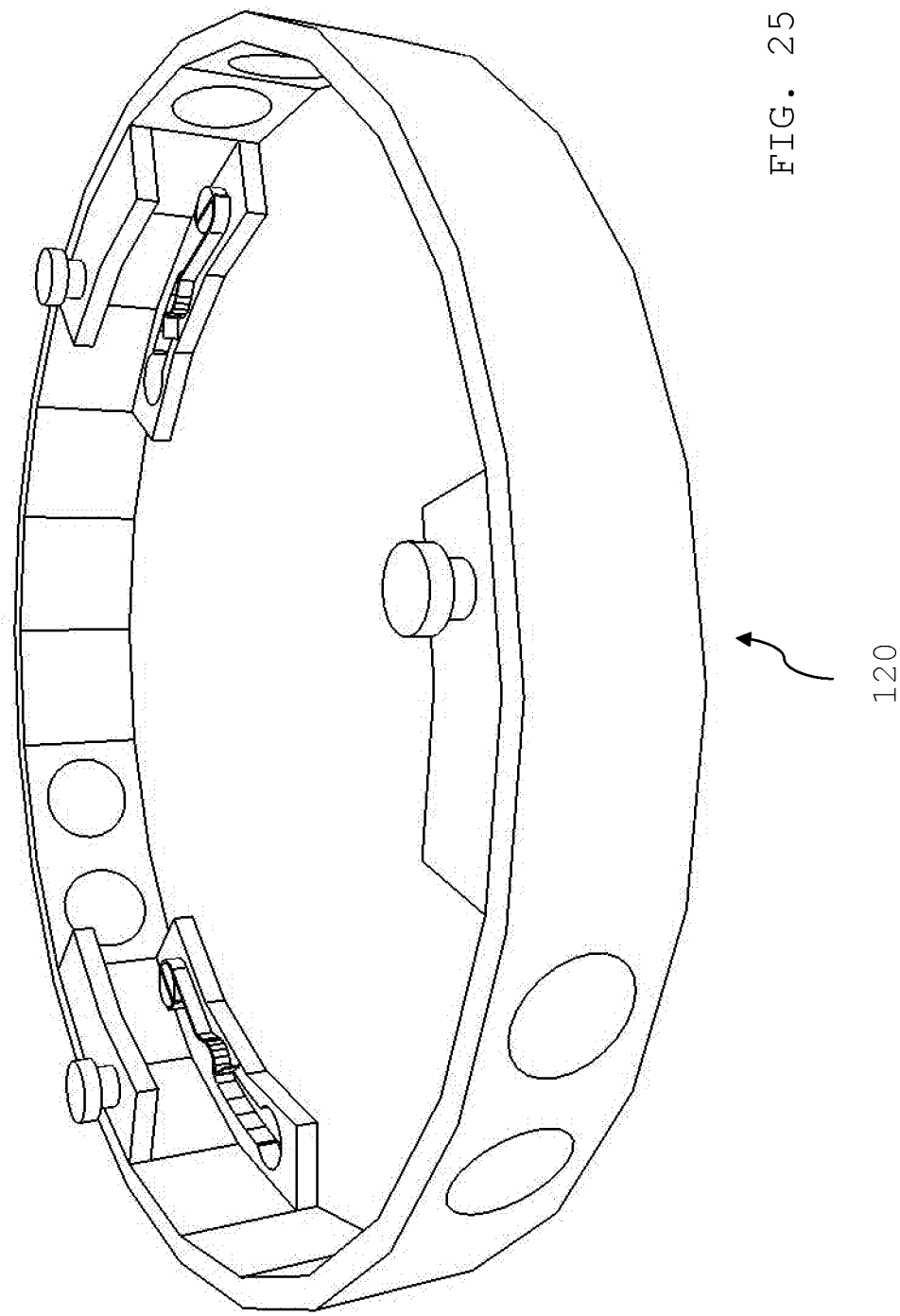
Figure 26:
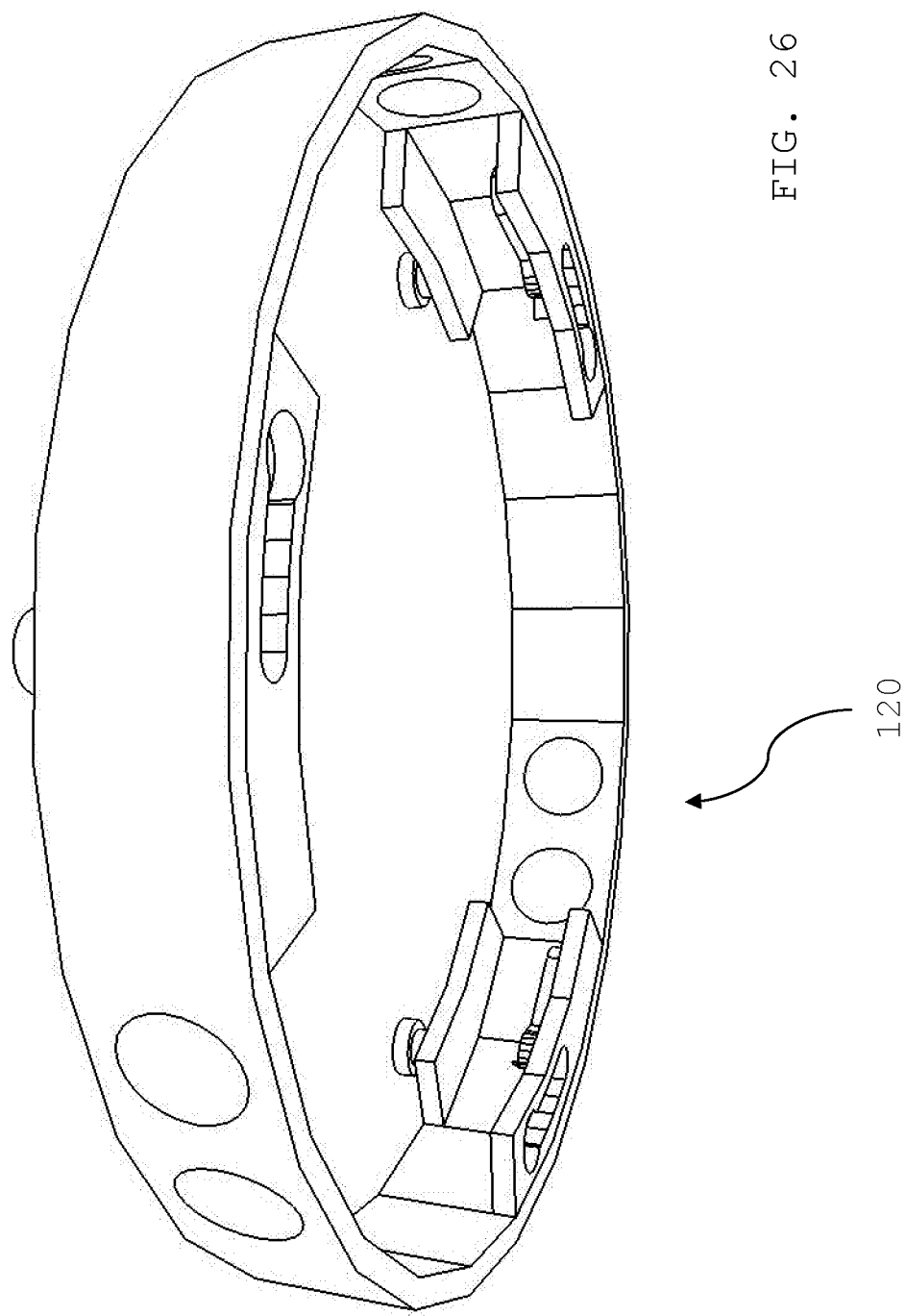
Figure 27:
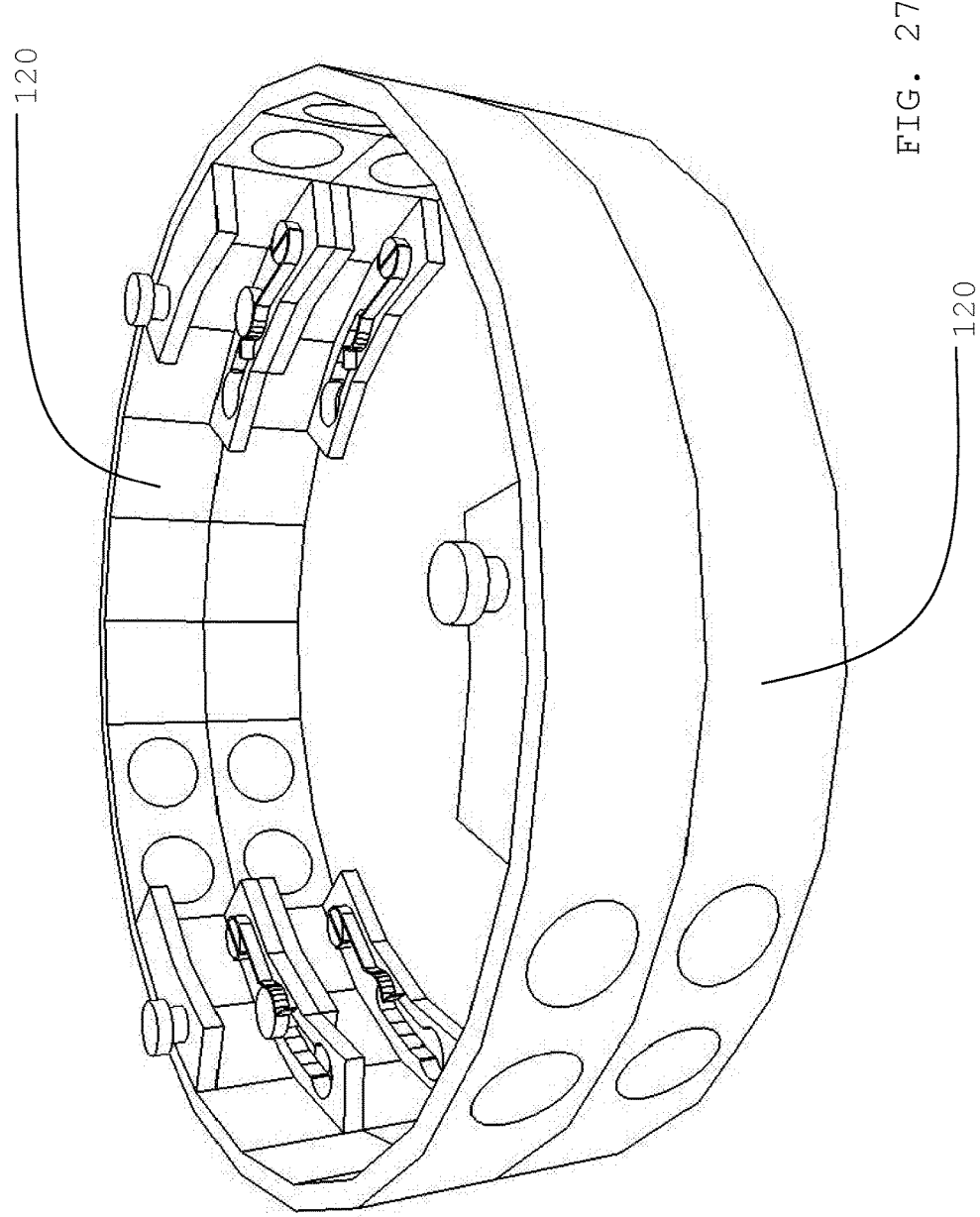
Figure 28:
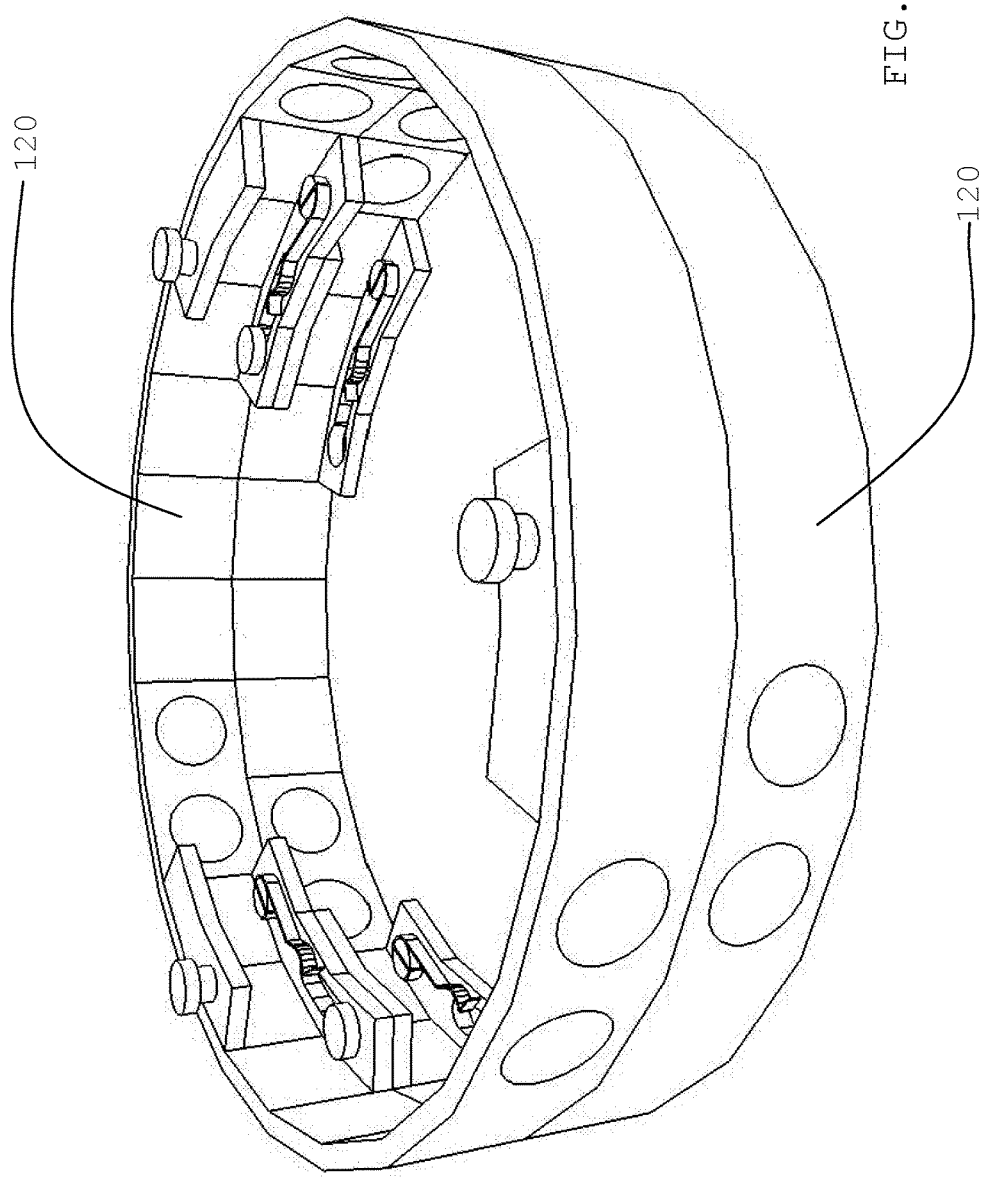
Figure 29:
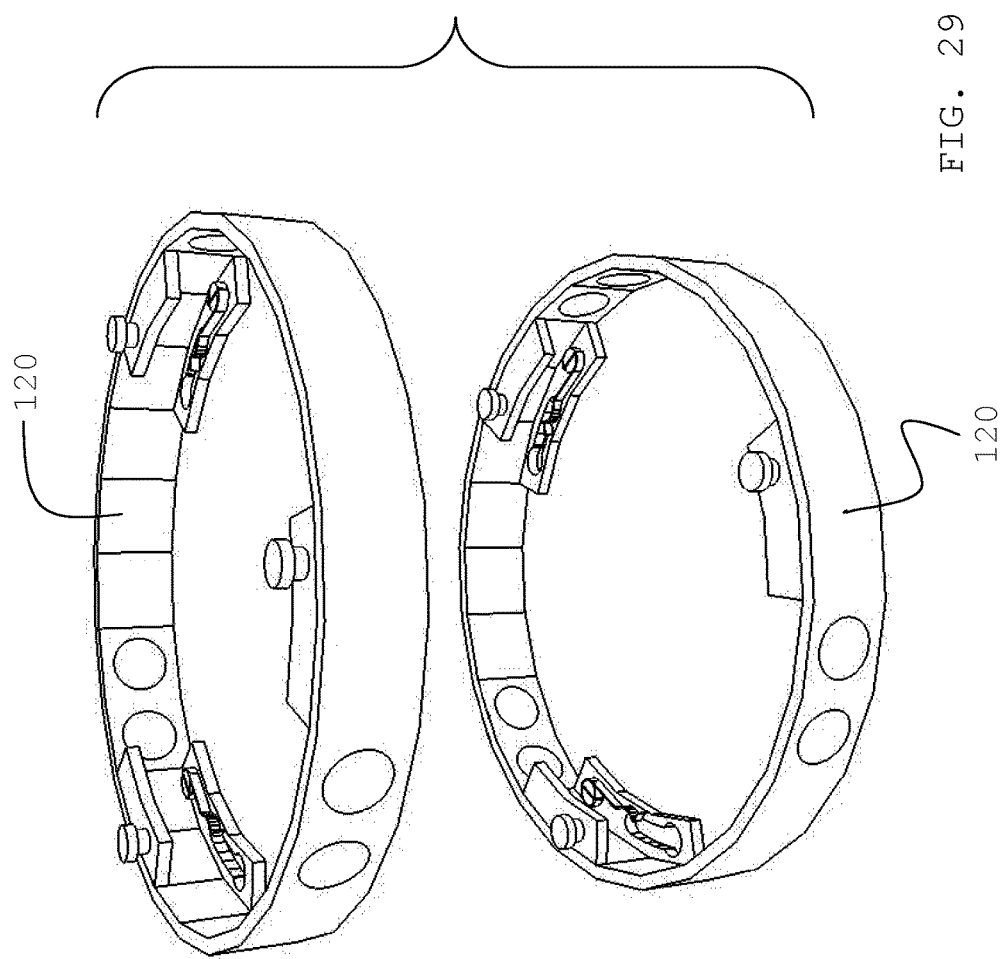
Figure 30:
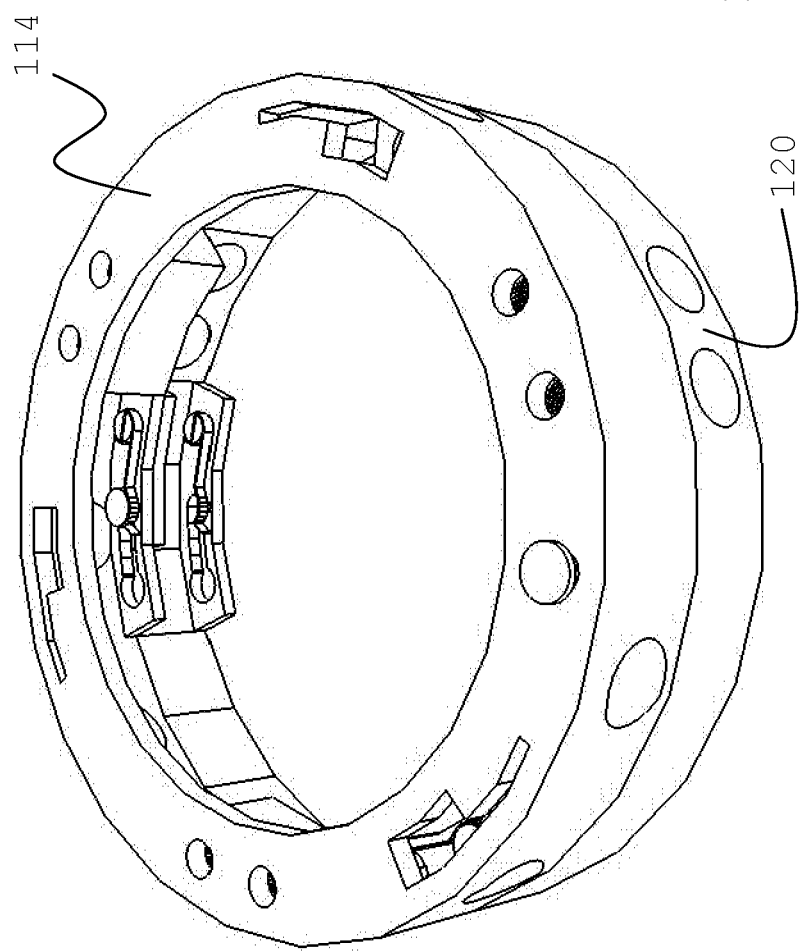
Figure 31:
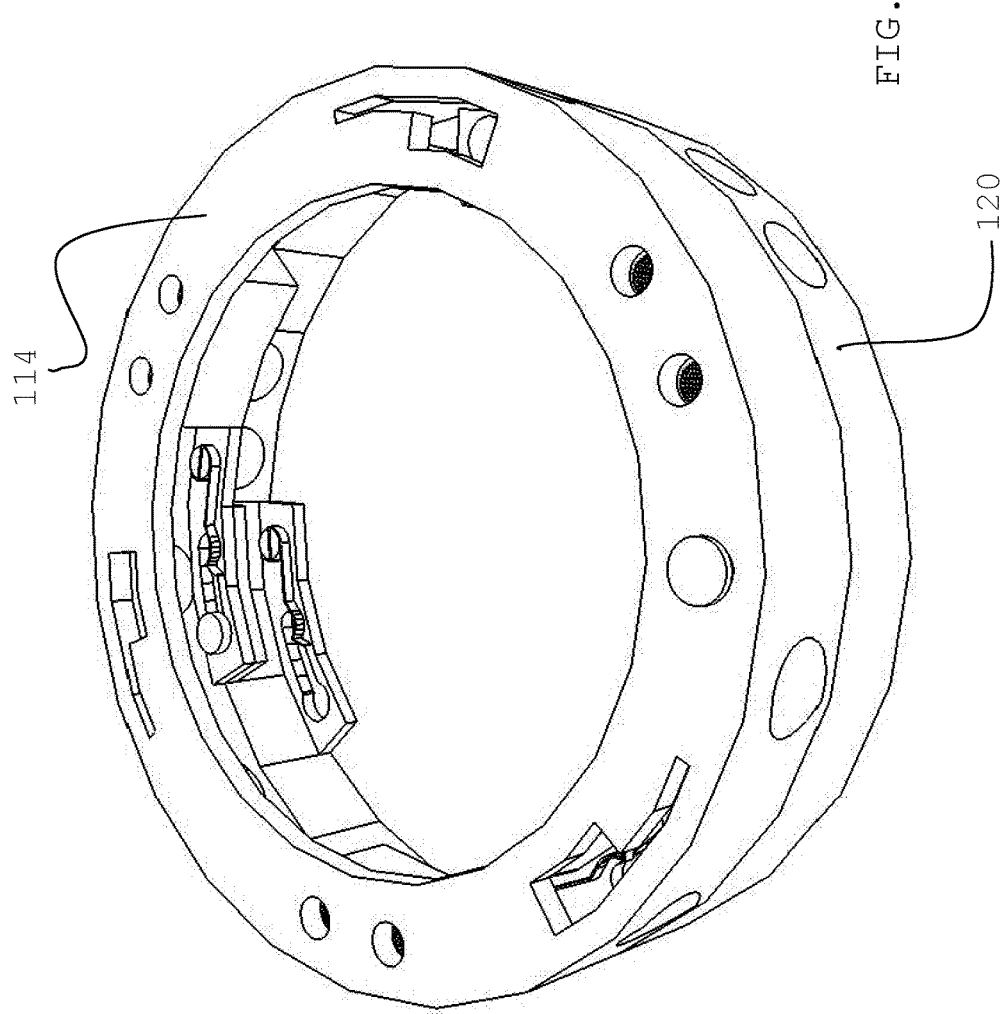
Figure 32:
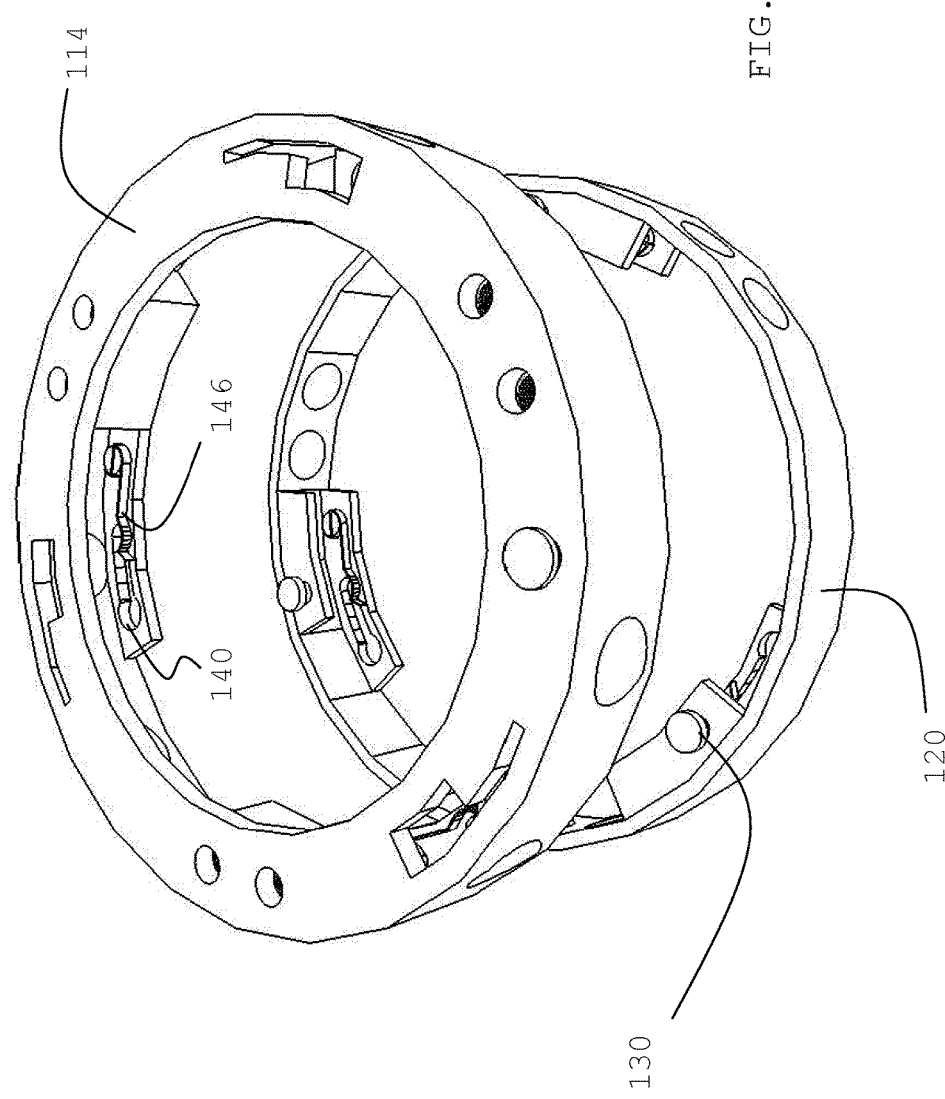
Figure 33:
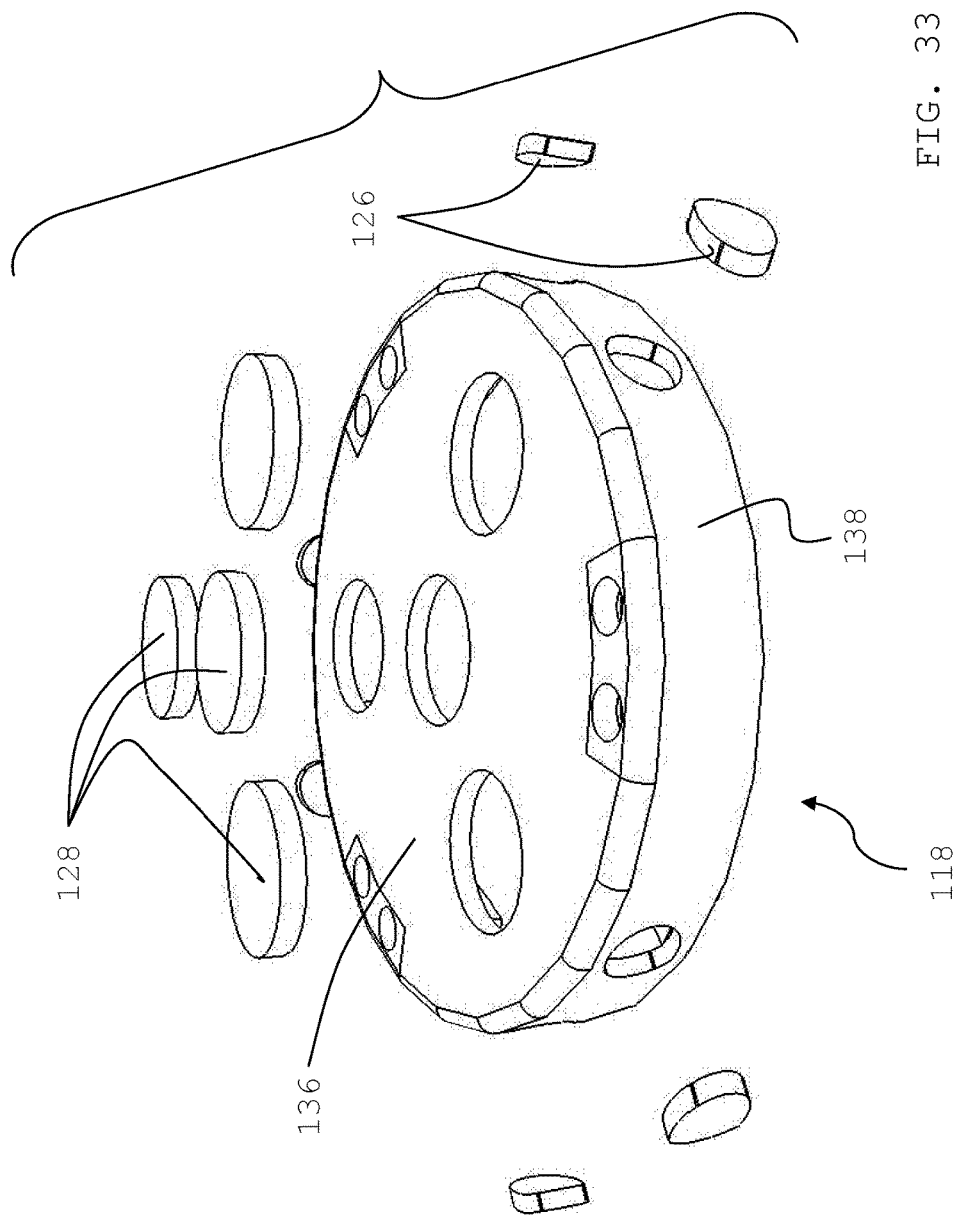
Figure 34:
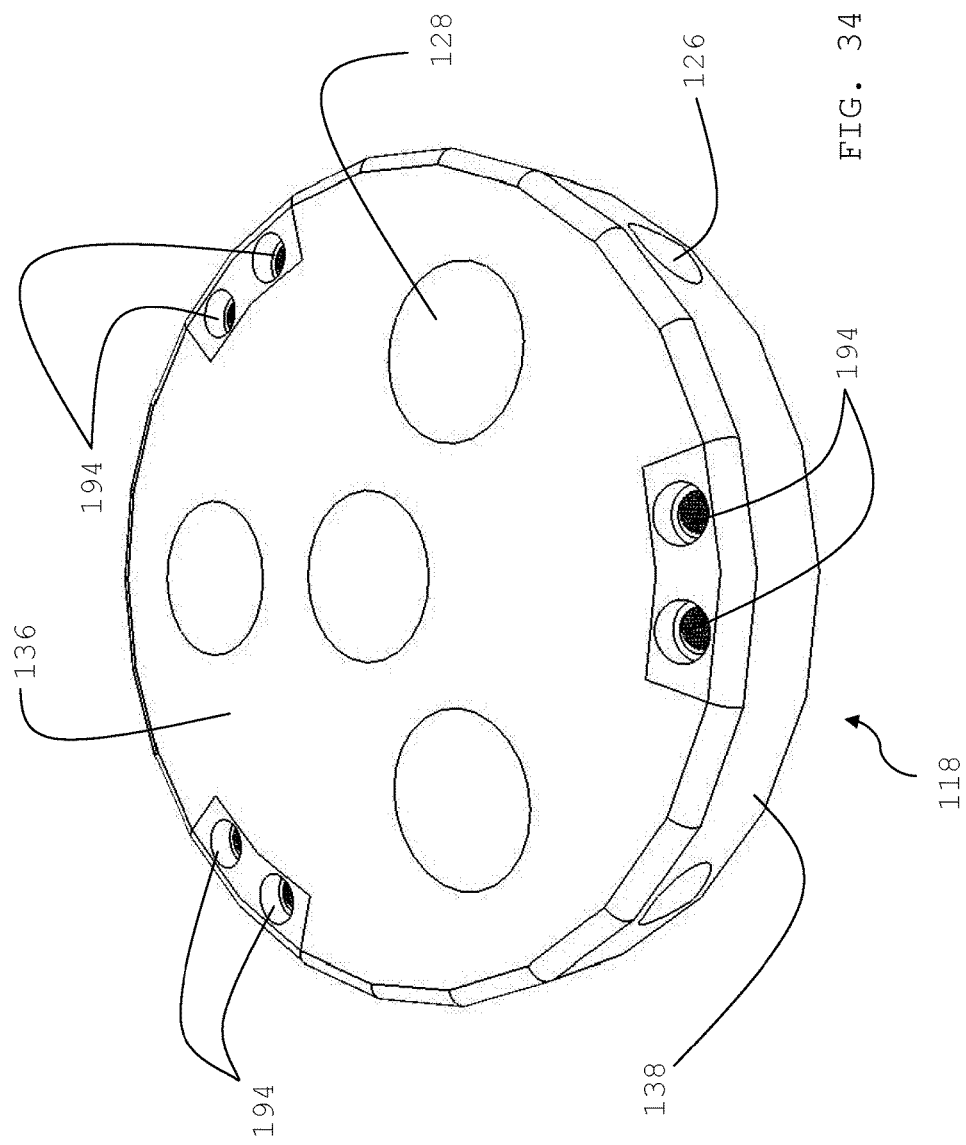
Figure 35:
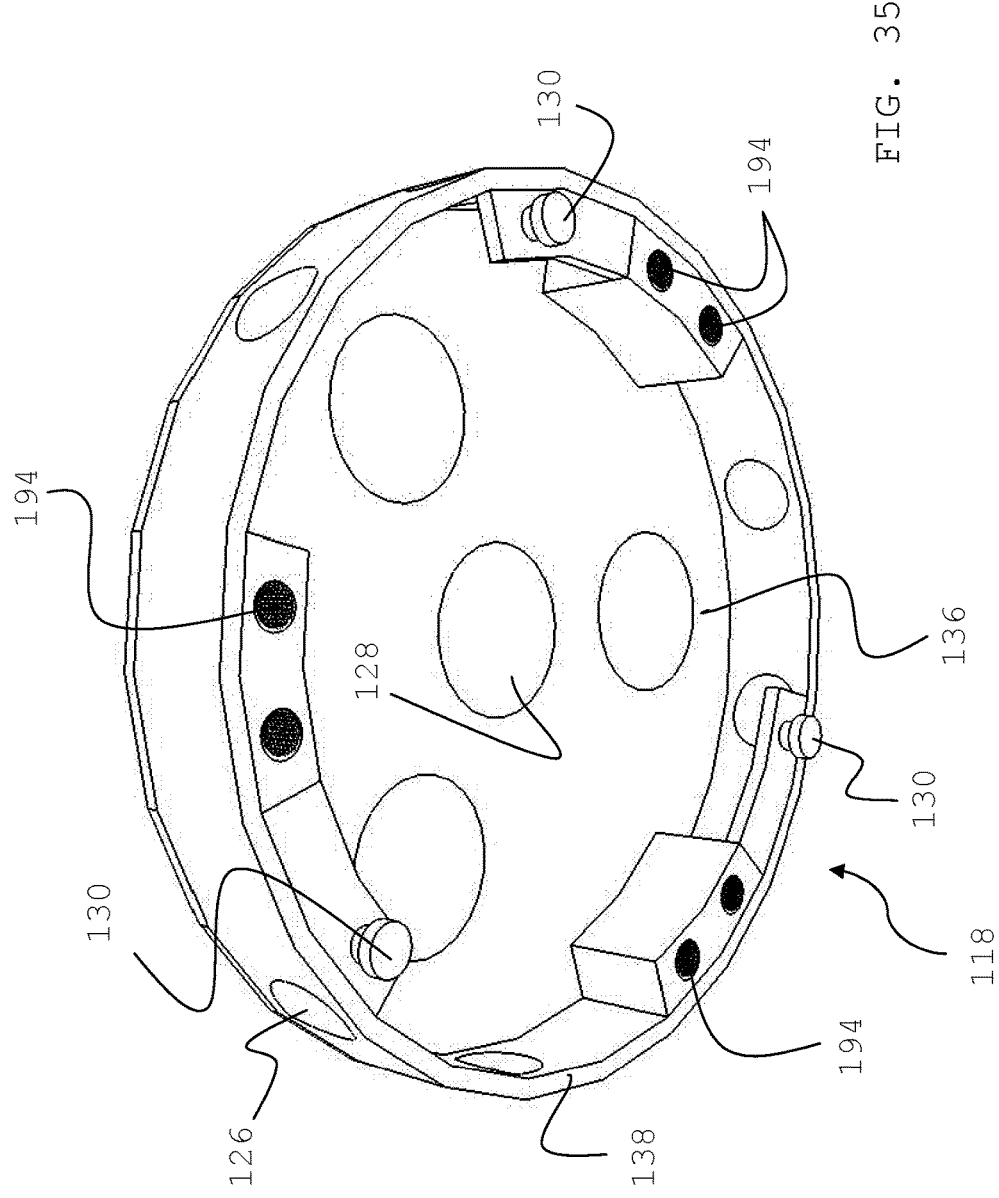
Figure 36:
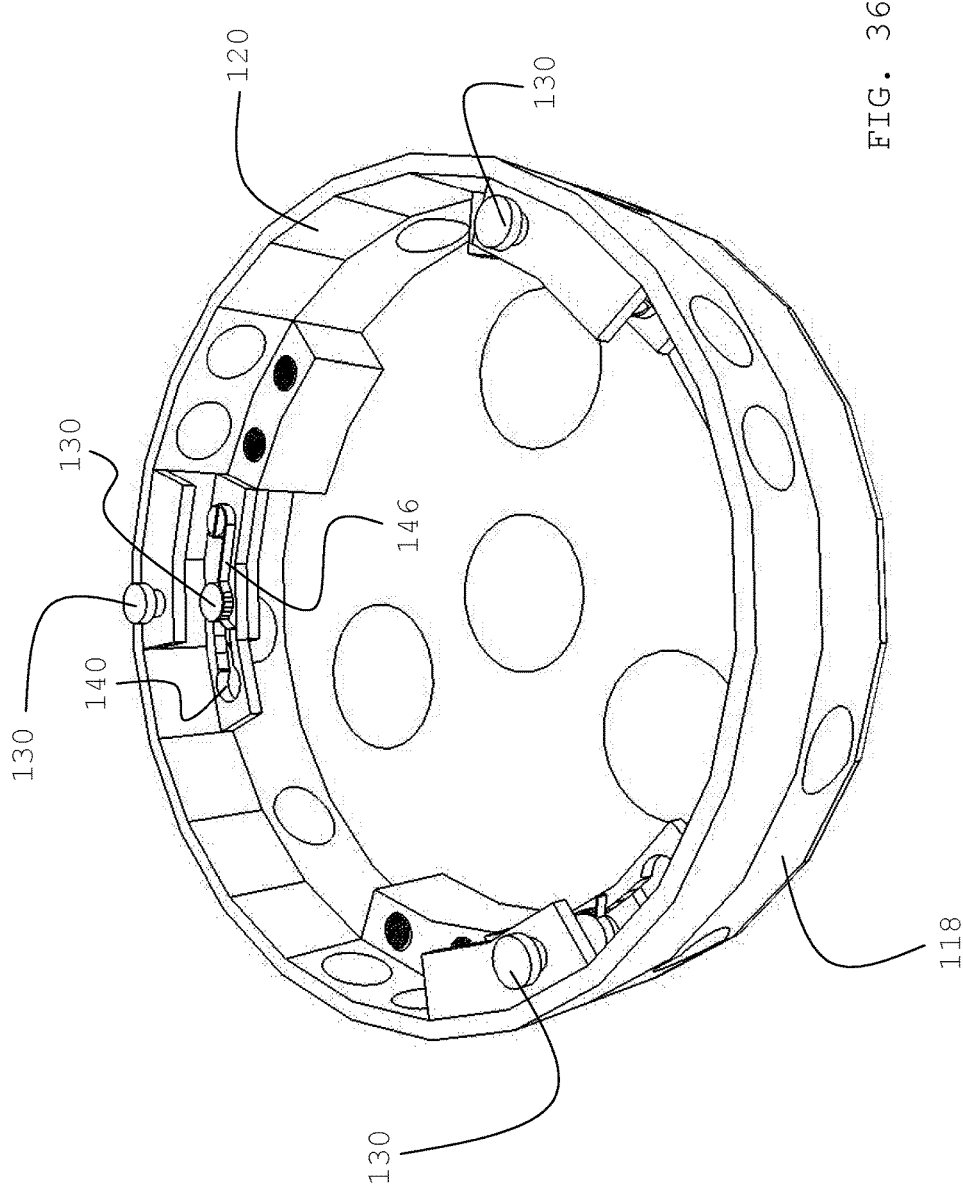
Figure 37:
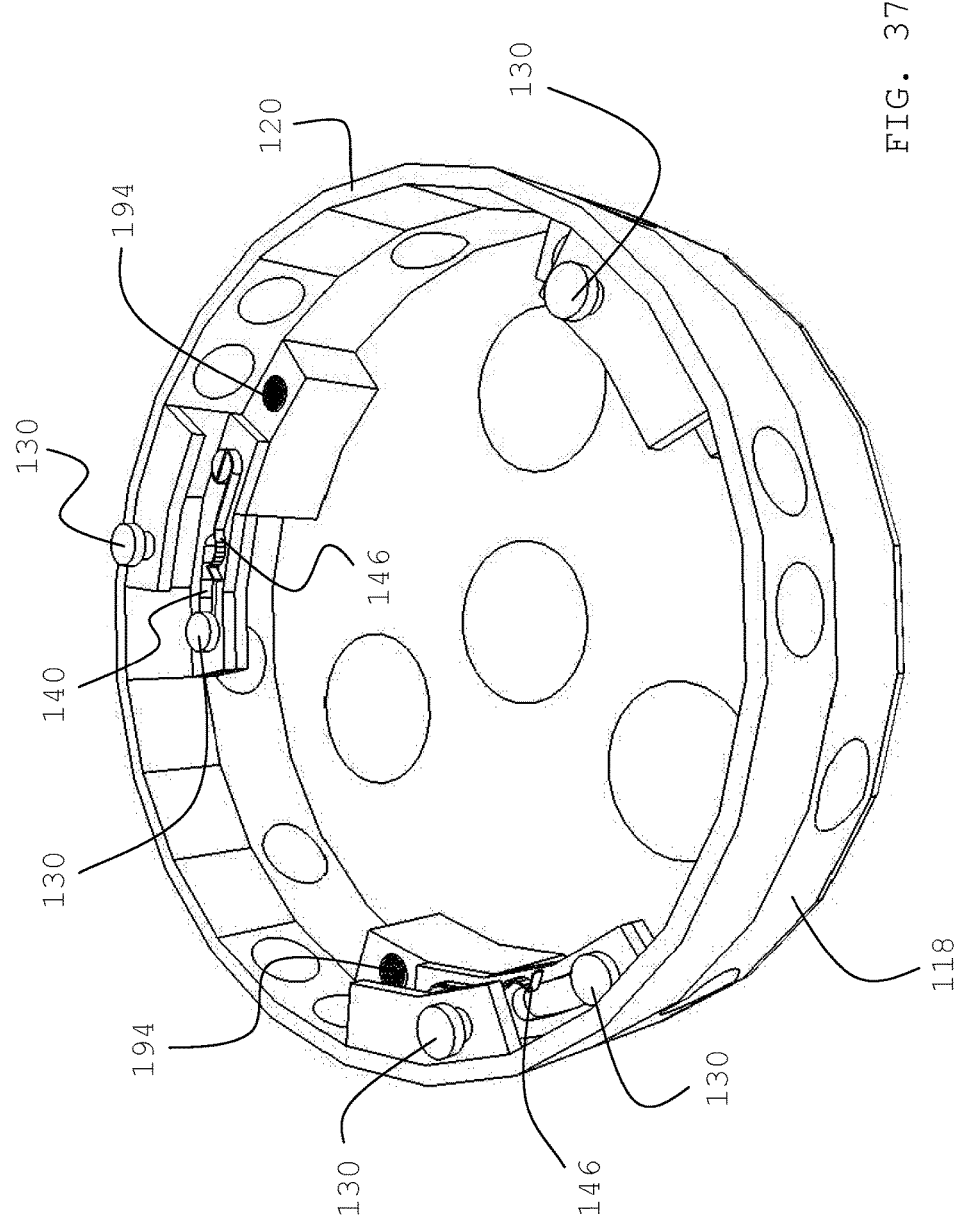
Figure 38:
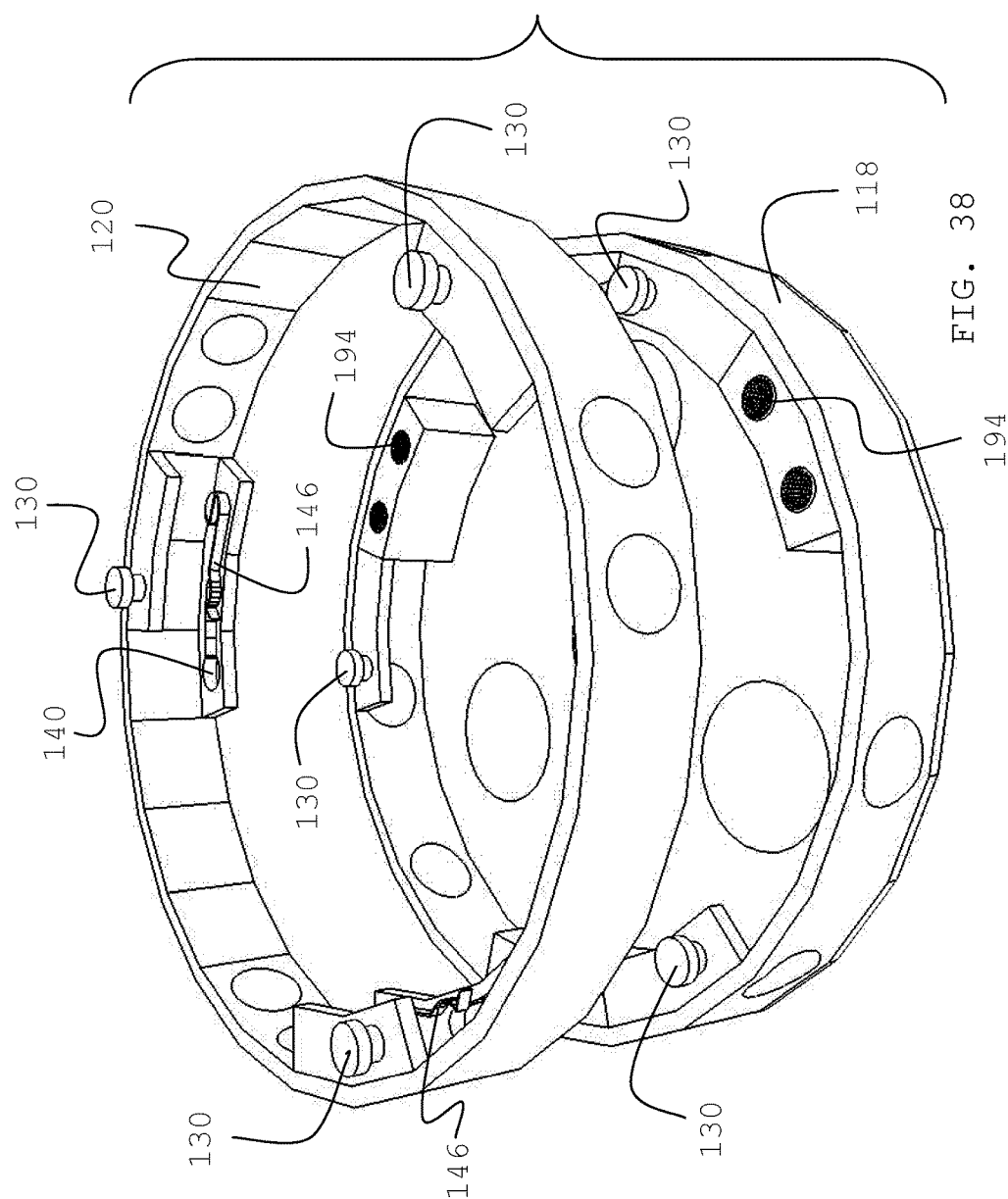
Figure 39:
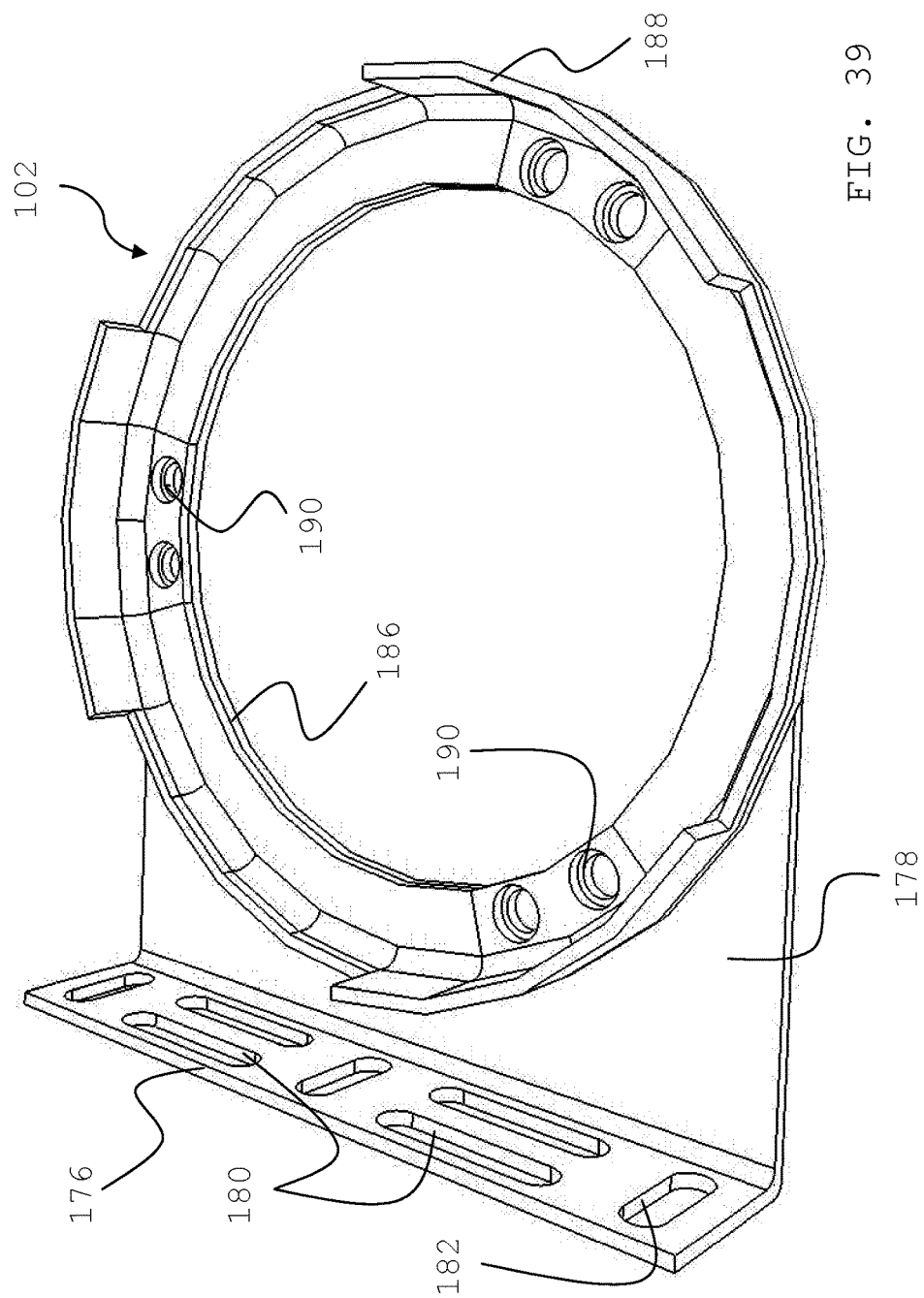
FIGS. 39-41 are perspective views of a bracket.
The same reference characters denote the corresponding features consistently throughout the attached drawings.
Figure 40:
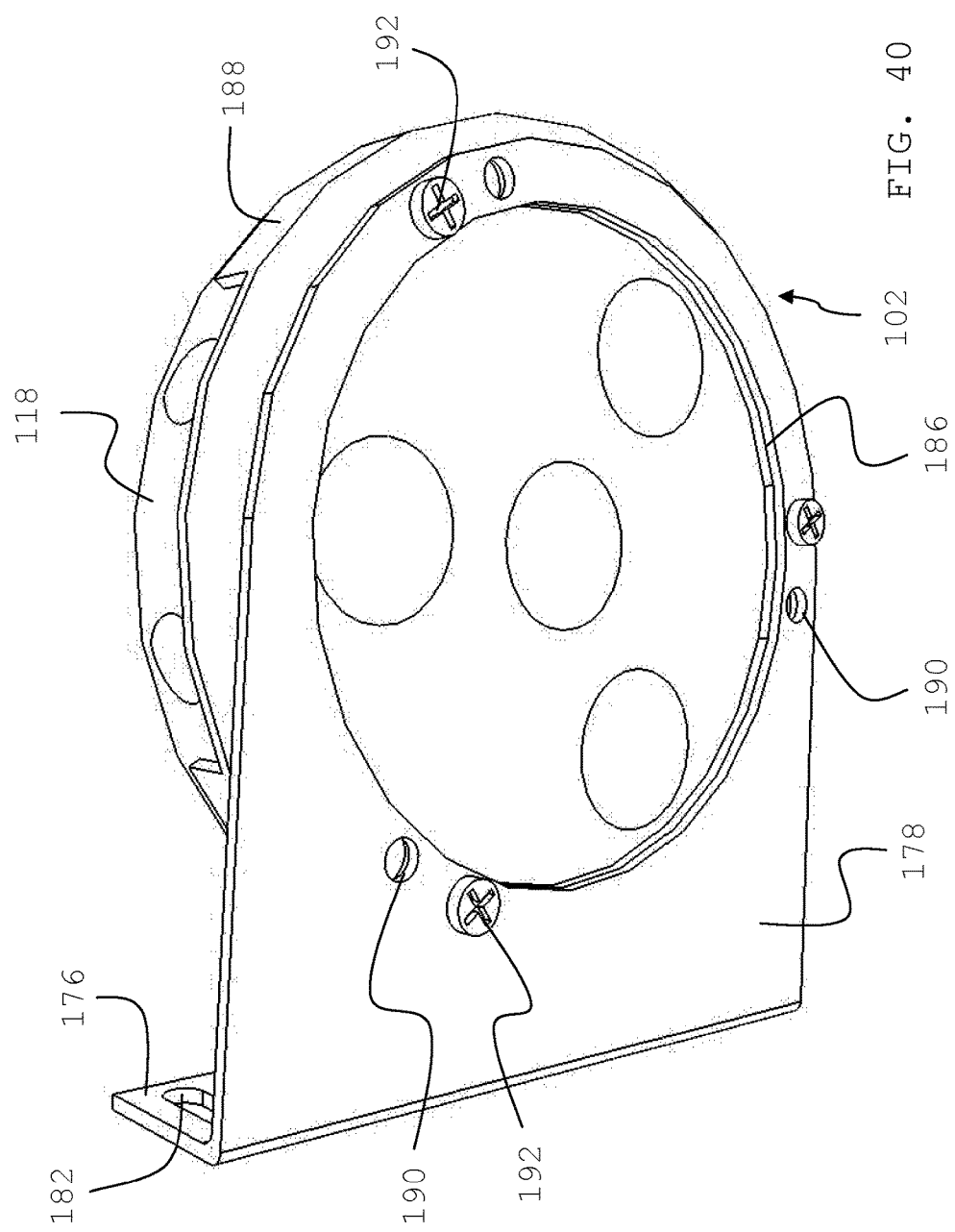
Figure 41:
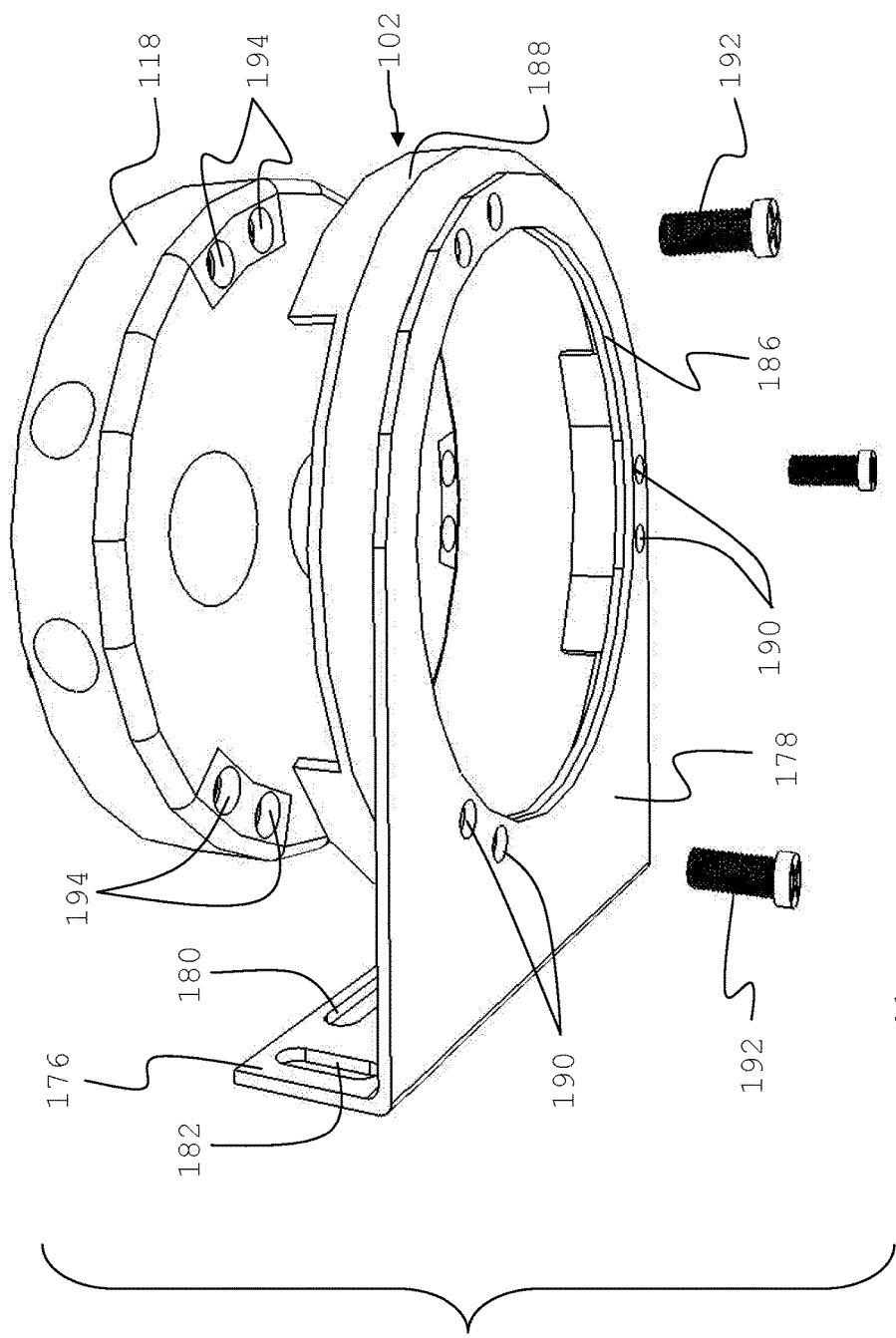

Referring to FIGS. 1-41, an embodiment 100 of an electrical box according to the present invention can be seen. The electrical box 100 is for housing electrical devices such as, without limitation, sockets, switches, light fixtures and the like. The electrical box 100 is usually mounted to a building structure or parts of a building structure such as the framing and positions the electrical device appropriately for access by persons using the device while protecting the electrical device from damage and short circuiting and the persons using the electrical device from electric shock hazards. The electrical box 100 includes a mounting bracket 102 for mounting the electrical box 100 to a framing member 104. It often happens that the available positions for attaching the bracket 102 to the frame member 104 is limited by other structures such as piping 106 or wiring (not shown). Also, the outer surface of a wall as defined by the outer surface of the sheet of drywall or sheetrock 108 may not always be the same distance from the frame member 104 because of, for example, presence or absence of intervening structure such as the nailing strip or nailer 110 or variations in the thickness of the sheetrock 108. Accordingly, it may not always be possible to conveniently install a standard depth electrical box at a desired location with the front opening of the electrical box it at the proper position relative to the outer surface of the drywall or sheetrock 108. The electrical box 100 of the present invention can overcome the aforementioned problem associated with standard electrical boxes because the electrical box 100 can be configured to have varying depth to match the available distance between the outer surface of the drywall 108 and a suitable position on a frame member 104 for attaching the electrical box.

The electrical box 100 of the present invention is also preferably cylindrical with a corresponding front opening 112 that is circular. Accordingly, the electrical box 100 is particularly well suited for use in conjunction with the powered circular cutter and cutter guide system disclosed in U.S. patent application Ser. No. 15/340,724, filed on Nov. 1, 2016, by the same inventor as in the present application, which is incorporated by reference herein in its entirety. The powered circular cutter and cutter guide system disclosed in U.S. patent application Ser. No. 15/340,724 facilitates the making of circular cutouts in drywall for electrical boxes with circular front openings.

In addition to the mounting bracket 102, the electrical box 100 also includes a front segment 114, which has the front opening 112 of the electrical box 100 formed in its front 116, a rear segment 118, and a plurality of intermediate or intervening segments 120. The depth of the electrical box 100 is adjusted or varied by varying the number of intermediate segments 120 placed between the front segment 114 and the rear segment 118. The rear segment 118 can be directly attached to the front segment 114 to provide an electrical box with the smallest depth. The depth of the electrical box can be increased by adding one or more intermediate segments 120 between the front segment 114 and the rear segment 118. The front segment 114, the intermediate segments 120, and the rear segment 118 are provided with knockout opening covers or knockouts 122, 124, and 126 and 128, respectively, that can be removed to allow electrical wiring to be routed into or out of the electrical box 100.

In the illustrated embodiment, the front of the rear segment 118 is provided with a first type of attachment means that includes a plurality of pegs 130. The pegs 130 project forward from the front of the segment to which they are attached. Each peg 130 has a shaft 132 of a first diameter and a head 134 of a second larger diameter. The rear of the rear segment 118 is enclosed or covered by the bottom plate 136 except for the openings that are covered by the knockouts 128. The rear segment 118 has a peripheral wall 138 that extends between the rear and front of the rear segment 118. In the illustrated embodiment, the peripheral wall 138 is annular. The front of the rear segment 118 is largely open. The rear of the rear segment 118 is provided with attachment means for attaching the mounting bracket 102 to the rear segment 118.

In the illustrated embodiment, the rear of the front segment 114 is provided with a second type of attachment means that is complementary to the first type of attachment means at the front of the other segments of the electrical box 100, which means that the first type of attachment means can be engaged to the second type of attachment means to attach the rear segment 118 to the front segment 114. The second type of attachment means includes a plurality of slots 140 that are capable of being engaged by the pegs 130. The slots 140 are approximately keyhole shaped and each has an elongated, arcuate or curved portion 142 joined with a circular portion 144 at one end. The center of curvature of the slot portions 142 is coaxial with the center of the front opening 112 of the electrical box 100. The slot portions 142 are at least wide enough for the shaft 132 of a corresponding peg 130 to be positioned in and extend through the slot portion 142, while the slot portions 142 are too narrow to allow the head 134 of a corresponding peg 130 to pass through the slot portion 142. The slot portions 144 are at least wide enough, i.e. have a large enough diameter, for the head 134 of a corresponding peg 130 to pass completely through the slot portion 144.

The pegs 130 are distributed circumferentially about the open front of the segment of which they are a fixed part, for example the rear segment 118, and the pegs 130 are distributed such that each peg 130 can be aligned, simultaneously with the other pegs 130, with a corresponding slot portion 144. To attach the front of one segment, for example the rear segment 118, to the rear of another segment, for example the front segment 114, the pegs 130 are aligned with slot portions 144. The front of the one segment, e.g. segment 118, is brought into abutting contact with the rear of the other segment, e.g. segment 114, such that the heads of the pegs 130 pass completely through their respective or corresponding slot portions 144. The segment 118 is then rotated relative to segment 114 to position the shaft of each peg 130 within its corresponding slot portion 142 so that the segments can no longer be pulled apart. The rotation is continued until the shaft of each peg 130 reaches the end of the corresponding slot portion 142 that is farthest from the corresponding slot portion 144. The first type of attachment means is now in the fully engaged position relative to the second type of attachment means. In turn, the segment 118 is in the fully engaged position relative to the segment 114.

The width of the slot portions 142 can be selected such that the frictional engagement between the slot portions 142 and the shafts of the pegs 130 is enough to secure the segments 118 and 114 together. Optionally, additional security can be provided by spring clips or hooks 146 that are supported at a fixed location inward of each slot 140 in relation to the rear of the segment of which the slots 140 are a part such that the clips 146 engage the heads of the corresponding pegs 130 to secure the segments together when the segments are in the fully engaged position relative to each other. To disengage the segments from each other enough torque must be applied between them to overcome the biasing or spring force of the clips 146. On the inward side, relative to the rear of the segment, of each slot 140, there should be enough clearance so that the movement of the pegs 130 between their fully engaged position and the alignment with slot portions 144 is not obstructed. Alternatively or in addition, the pegs 130 can be provided with transverse bores that align with bores in the peripheral wall of the segment when the pegs 130 are their fully engaged position. Then, one or more roll pins or the like can be placed such that it extends through both bores in order to lock the two segments together.

The rear of the front segment 114 is largely open and cooperates with the open front of the adjacent segment to form a continuous enclosed space. The front 116 of the front segment 114 is provided with a transverse, annular flange 117. The inner edge of the annular flange 117 defines the front opening 112 of the electrical box 100. The front segment 114 is provided with means for supporting an electrical device such as, for example, the dual electrical sockets 148.

In the illustrated embodiment, the front segment 114 is provided with female threaded holes 150. The holes 150 allow the attachment of the inner cover 152, which is preferably decorative, to the front of the front segment 114 using screws 154. The dual sockets 148 are attached to the inner decorative cover 152 by a screw 156. The inner cover 152 covers the gap between the electrical device and the front opening 112 of the electrical box 100. An outer cover 158, which is preferably decorative, covers the gap between the front of the front segment 114 and the corresponding hole in the drywall 108. The front of the front segment 114, and in turn the front of the electrical box 100, is properly positioned relative to the exterior surface of the drywall 108 when the annular outer cover 158 is in abutting contact with the exterior surface of the drywall 108 when the outer cover 158 is properly secured to the front segment 114.

The outer cover 158 has a plurality of posts 160 that project outward from its backside. The posts 160 each have a leg 162 and a head 164. The head 164 is wider than the leg 162. The posts 160 are engageable with slots 166 provided in the annular flange 117. The front segment 114 has a peripheral wall 115 that extends between the rear and front of the front segment 114. In the illustrated embodiment, the peripheral wall 115 is annular.

Each of the slots 166 has an elongated, arcuate or curved portion 168 joined with a wider portion 170 at one end. The center of curvature of the slots 166 is coaxial with the center of the front opening 112 of the electrical box 100. The slot portions 168 are at least wide enough for the leg 162 of a corresponding post 160 to be positioned in and extend through the slot portion 168, while the slot portions 168 are too narrow to allow the head 164 of a corresponding post 160 to pass through the slot portion 168. The slot portions 170 are at least wide enough for the head 164 of a corresponding post 160 to pass completely through the slot portion 170.

The posts 160 are distributed circumferentially about the open rear of the outer cover 158 of which they are a fixed part. The posts 160 are distributed such that each post 160 can be aligned, simultaneously with the other posts 160, with a corresponding slot portion 170. To attach the outer cover 158 to the front of the front segment 114, the posts 160 are aligned with slot portions 170. The rear of the outer cover 158 is brought into abutting contact with the front of the front segment 114 or the exterior of the drywall 108 such that the heads of the posts 160 pass completely through their respective or corresponding slot portions 170. The outer cover 158 is then rotated relative to segment 114 to position the leg of each post 160 within its corresponding slot portion 168 so that the outer cover 158 and the segment 114 can no longer be pulled apart. The rotation is continued until the leg of each post 160 reaches the end of the corresponding slot portion 168 that is farthest from the corresponding slot portion 170. The outer cover 158 is then in the fully engaged position relative to the segment 114.

The width of the slot portions 168 can be selected such that the frictional engagement between the slot portions 168 and the legs of the posts 160 is enough to secure the outer cover 158 and the segment 114 together. Optionally, additional security can be provided by spring clip or hook 172 that is supported at a fixed location at the rear of the outer cover 158 such that the clip 172 engages a peg 174 fixedly supported by the front flange 117 of the front segment 114 to secure the outer cover 158 and the front segment 114 together when they are in the fully engaged position relative to each other. To disengage the outer cover 158 from the front segment 114, enough torque must be applied between them to overcome the biasing or spring force of the clip 172.

In the illustrated embodiment, the front of each intermediate segment 120 is provided with the first type of attachment means that includes the plurality of pegs 130 as have already been described. In the illustrated embodiment, the rear of each of the intermediate segments 120 is provided with the second type of attachment means that is complementary to the first type of attachment means and includes a plurality of slots 140 as have already been described and that are capable of being engaged by the pegs 130. Each intermediate segment 120 has a peripheral wall 121 that extends between the rear and front of the intermediate segment 120. In the illustrated embodiment, the peripheral wall 121 is annular. The rear of each intermediate segment 120 can be attached and secured to the front of every other intermediate segment 120 and the front of the rear segment 118 in exactly the same manner as described for the attachment of the rear of the front segment 114 to the front of the rear segment 118. Also, the front of each intermediate segment 120 can be attached and secured to the rear of every other intermediate segment 120 and the rear of the front segment 114 in exactly the same manner as described for the attachment of the front of the rear segment 118 to the rear of the front segment 114. The rear and front of each intermediate segment 120 are largely open and cooperate, respectively, with the open front and open rear of any attached, adjacent segment to form a continuous enclosed space.

The mounting bracket 102 includes a right angle plate having a first portion 176 and a second portion 178. The first portion 176 is design to be placed in abutting contact with the frame member 104, while the second portion 178 projects perpendicularly from the first portion 176. The first portion 176 has a plurality of vertical and horizontal slots 180 and 182 that provide clearance for the threaded shafts of mounting screws 184. The mounting screws 184 are used to securely mount or attach the bracket 102 to the frame member 104. The bracket 102 is attached to the frame member 104 such that the second portion 178 is parallel to the drywall 108. The slots 180 and 182 are elongated in the vertical and horizontal directions, respectively, to allow fine adjustments to be made to the position of the front opening 112 of the electrical box 100 relative to the exterior surface of the drywall 108 to ensure that the front opening 112 of the electrical box 100 is positioned correctly relative to the exterior surface of the drywall 108 and the opening in the drywall 108 for the electrical box 100. The front opening 112 of the electrical box 100 is positioned correctly relative to the exterior surface of the drywall 108 and the opening in the drywall 108 for the electrical box 100 when the annular outer cover 158 is in abutting contact with the exterior surface of the drywall 108 when the outer cover 158 is properly secured to the front segment 114. The number of intermediate segments 120 placed between the front segment 114 and the rear segment 118 is selected such that the electrical box 100 is of such depth or length that it can fit within the available space between the exterior of the drywall 108 and the mounting position of the bracket 102 to the frame member 104 and be correctly positioned relative to the exterior surface of the drywall 108 and the opening in the drywall 108 for the electrical box 100 within the available fine adjustment range in the position of the electrical box 100 provided by the slots 180 and 182.

The second portion 178 of the bracket 102 has an opening 186 to allow the openings in the bottom of the rear segment 118 that are initially covered by knockout plugs 128 to be used for routing wires if desired once a knockout plug 128 is removed. The bracket 102 includes an annular wall 188. The annular wall 188 projects from the second portion 178 of the bracket 102 toward the drywall 104 when the bracket 102 is mounted to the frame member 104. The annular wall 188 surrounds the opening 186. Holes 190 are provided in the second portion 178 of the bracket 102. The holes 190 are positioned between the opening 186 and the annular wall 188. Each of the holes 190 provides clearance for the threaded shaft of a respective screw 192 but not for the head of the respective screw 192. The rear segment 118 is provided with female threaded holes 194 that are accessible through the bottom of the rear segment 118. The second portion 178 of the bracket 102 and the annular wall 188 cooperatively receive the bottom of the rear segment 118 while the holes 194 in the bottom of the rear segment 118 are in registry with the holes 190. The screws 192 can then be used to securely attach the bracket 102 to the electrical box 100 when the screws 192 are engaged to the holes 194 while their threaded shafts extend through respective holes 190. In this way, the electrical box 100 can be securely attached or mounted to the frame member 104 using the mounting bracket 102 and the screws 184 and 192. The holes 190 may be in the form of elongated, arcuate slots to allow adjustment of the rotational position of the electrical box 100 in order to ensure that, for example, the slots in the sockets 148 for the prongs of electrical plugs (not shown) are oriented vertically.

It is to be understood that the present invention is not limited to the embodiments described above, but encompasses any and all embodiments within the scope of the appended claims. In addition, the present invention encompasses any and all combinations of the various disclosed aspects of the present invention.

LISTING OF REFERENCE NUMERALS AND CORRESPONDING PARTS

100 The length/depth adjustable electrical box
102 Mounting bracket
104 Frame member of building structure
106 Piping passing through frame member 104

108 Sheetrock/drywall/wallboard
110 Nailing strip
112 Front opening of electrical box 100
114 Front segment of electrical box 100
115 Lateral/peripheral annular wall of the front segment 114 of electrical box 100
116 Front of the front segment 114 of electrical box 100
117 Front annular flange of the front segment 114 of electrical box 100
118 Rear segment of electrical box 100
120 Intermediate segment of electrical box 100
121 Lateral/peripheral annular wall of the intermediate segment of electrical box 100
122 Knockout plugs in the peripheral wall of the front segment 114
124 Knockout plugs in the peripheral wall of the intermediate segment 120
126 Knockout plugs in the peripheral wall of the rear segment 118
128 Knockout plugs in the bottom wall of the rear segment 118
130 Pegs provided at the front of the intermediate segments 120 and the rear segment 118
132 Shaft of peg 130
134 Head of peg 130
136 Bottom plate or wall of rear segment 118
138 Peripheral wall of rear segment 118
140 Slots provided at the rear of the front segment 114 and the intermediate segments
120 that are engageable by the pegs 130
142 Narrow portion of the slot 140
144 Wide portion of the slot 140
146 Spring clips for engaging the pegs 130
148 Electrical sockets
150 Female threaded holes in front segment 114
152 Inner cover
154 Screws for attaching inner cover to the front segment 114
156 Screw for attaching the electrical sockets 148 to the inner cover 152
158 Outer cover
160 Posts projecting from the rear of the outer cover 158
162 Leg of the post 160
164 Head of the post 160
166 Slots provided at the front of the front segment 114 for engagement by the posts 160
168 Narrow portion of the slot 166
170 Wide portion of the slot 166
172 Spring clip fixed to the outer cover 158
174 Peg fixedly supported by the front flange 117 of the front segment 114
176 first portion of the bracket 102
178 second portion of the bracket 102
180 Vertical slots in the first portion of the bracket 102
182 Horizontal slots in the first portion of the bracket 102
184 Mounting screws for mounting bracket 102 to frame member 104
186 Large opening in second portion 178 of the bracket 102 for routing wire to the rear of the rear segment 118
188 Annular wall surrounding the opening 186
190 Holes provided in the second portion 178 of the bracket 102
192 Screws for securing the rear segment 118 to the mounting bracket 102
194 Threaded holes in the rear segment 118 for engagement by the screws 192

The invention claimed is:

1. A kit for forming and installing an electrical box for housing at least one electrical device, the kit comprising:
a front segment having a rear;
a plurality of intermediate segments each having a front and a rear; and
a rear segment having a front,
wherein said front of said rear segment is provided with an attachment means of a first type, wherein said rear of said front segment is provided with an attachment means of a second type, wherein said front of each intermediate segment is provided with an attachment means of the first type, wherein said rear of each intermediate segment is provided with an attachment means of the second type, wherein each attachment means of the first type is attachable to every attachment means of the second type provided in the kit, such that the rear segment is attached to the front segment to form an electrical box of minimum length, and, if needed, the length of the electrical box is increased to make the electrical box suitable for the available space within a building structure by inserting a user selected number of intermediate segments between the rear segment and the front segment while the attachment means of the first type and the attachment means of the second type allow the rear segment, the selected number of intermediate segments, and the front segment to be securely attached in series.

2. The kit according to claim 1, further comprising a bracket for attaching the electrical box to a frame member of a building structure.

3. The kit according to claim 2, wherein the rear segment, the intermediate segments, and the front segment are shaped such that an electrical box formed using the kit is cylindrical and has a circular front opening for access to the electrical device housed by the electrical box.

4. A kit for forming and installing an electrical box for housing at least one electrical device, the kit comprising:
a front segment having a rear;
a rear segment having a front; and
at least one cover that is capable of being attached to the front segment, said cover having at least one opening through which the electrical device is accessible,
wherein the rear segment is capable of being attached to the front segment to form at least part of an electrical box, wherein the rear segment and the front segment are shaped such that an electrical box formed using the kit is cylindrical and has a circular front opening for access to the electrical device housed by the electrical box, said circular front opening being different from said opening of said cover, wherein said cover is adapted for being attached to said front segment at about said circular front opening wherein said cover is attachable to said front segment using posts and corresponding slots, wherein said posts are capable of engaging with the corresponding slots, and wherein each of said corresponding slots has a curved portion and a wider portion.

5. The kit according to claim 4, further comprising a bracket for attaching the electrical box to a frame member of a building structure.

6. A kit for forming and installing an electrical box for housing at least one electrical device, the kit comprising:
a front segment having a rear;
a plurality of intermediate segments each having a front and a rear; and
a rear segment having a front, at least one cover that is capable of being attached to the front segment, said cover having at least one opening through which the electrical device is accessible, wherein said front of said rear segment is provided with an attachment means of a first type, wherein said rear of said front segment is provided with an attachment means of a second type, wherein said front of each intermediate segment is provided with an attachment means of the first type, wherein said rear of each intermediate segment is provided with an attachment means of the second type, wherein each attachment means of the first type is attachable to every attachment means of the second type provided in the kit, such that the rear segment is attached to the front segment to form an electrical box of minimum length, and, if needed, the length of the electrical box is increased to make the electrical box suitable for the available space within a building structure by inserting a user selected number of intermediate segments between the rear segment and the front segment while the attachment means of the first type and the attachment means of the second type allow the rear segment, the selected number of intermediate segments, and the front segment to be securely attached in series.

7. The kit according to claim 6, further comprising a bracket for attaching the electrical box to a frame member of a building structure.

8. The kit according to claim 7, wherein the rear segment, the intermediate segments, and the front segment are shaped such that an electrical box formed using the kit is cylindrical and has a circular front opening for access to the electrical device housed by the electrical box.

* * * * *